(12) United States Patent
Matsushita

(10) Patent No.: US 7,568,094 B2
(45) Date of Patent: Jul. 28, 2009

(54) CONTENT PROVIDING SYSTEM, USER SYSTEM, TRACING SYSTEM, APPARATUS, METHOD, AND PROGRAM

(75) Inventor: Tatsuyuki Matsushita, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 918 days.

(21) Appl. No.: 11/038,235

(22) Filed: Jan. 21, 2005

(65) Prior Publication Data

US 2005/0157878 A1   Jul. 21, 2005

(30) Foreign Application Priority Data

Jan. 21, 2004 (JP) ............... 2004-013355
Jan. 14, 2005 (JP) ............... 2005-007815

(51) Int. Cl.
*G06F 9/00* (2006.01)
*H04L 9/00* (2006.01)

(52) U.S. Cl. ............... 713/155; 713/30; 709/221

(58) Field of Classification Search ............... 713/155, 713/30; 709/224; 707/10; 380/44
See application file for complete search history.

(56) References Cited

U.S. PATENT DOCUMENTS

| 5,841,865 A | 11/1998 | Sudia |
| 2003/0152234 A1 | 8/2003 | Matsushita |
| 2005/0157878 A1 | 7/2005 | Matsushita |

FOREIGN PATENT DOCUMENTS

| CN | 1138927 A | 12/1996 |
| CN | 1442978 A | 9/2003 |
| EP | 1 331 751 A1 | 7/2003 |
| JP | 2003-289296 | 10/2003 |

OTHER PUBLICATIONS

On the design of secure group-oriented communication channels in Internet environments Woei-Jiunn Tsaur; Shi-Jinn Horng; Personal, Indoor and Mobile Radio Communications, 1996. PIMRC'96., Seventh IEEE International Symposium on vol. 3, Oct. 15-18, 1996 pp. 1243-1247 vol. 3.*

(Continued)

*Primary Examiner*—David Y Jung
(74) *Attorney, Agent, or Firm*—Oblon, Spivak, McClelland, Maier & Neustadt, P.C.

(57) ABSTRACT

With each embodiment of the present invention, a content providing system comprises a content encrypting section which encrypts content by use of a session key and a header generating section which encrypts the session key by use of an encryption key in such a manner that the session key can be obtained by use of a decryption key assigned to a user system and generates header information including the encrypted session key and one or more values based on user identification information of each of the user systems that are permitted to obtain the session key. The content providing system transmits the encrypted content and the header information to each user system. Since the header information does not explicitly include user identification information of the user systems, information about whose decryption keys have been revoked is not leaked out in the block box tracing.

21 Claims, 11 Drawing Sheets

OTHER PUBLICATIONS

Collision Attacks With Budget Constraints on Key Management Schemes for Secure Multimedia Multicast Zhu, W. T.; Multimedia, IEEE Transactions on vol. 11, Issue 3, Apr. 2009 pp. 556-561.* sStream: Peer-to-Peer Live Streaming with Efficient User Authentication and Key Management Xuening Liu; Hao Yin; Chuang Lin; Communications and Networking in China, 2007. CHINACOM '07. Second International Conference on Aug. 22-24, 2007 pp. 270-274.*

Kaoru Kurosawa, et al., "Optimum Traitor Tracing and Asymmetric Schemes", Proc of Eurocrypt, 1998, LNCS 1403, Springer-Verlag, pp. 145-157.

Kaoru Kurosawa, et al., "Linear Code Implies Public-Key Traitor Tracing", Proc of PKC, 2002, LNCS 2274, Springer-Verlag, pp. 172-187.

Tatsuyuki Matsushita, "A Flexibly Revocable Key-Distribution Scheme for Efficient Black-Box Tracing", Proc of ICICS, 2002, LNCS 2513, Springer-Verlag, pp. 197-208.

Moni Naor, et al., "Efficient Trace and Revoke Schemes", Proc of Financial Cryptography, Feb. 2000, LNCS 1962, Springer-Verlag, pp. 1-24.

U.S. Appl. No. 11/531,553, filed Sep. 13, 2006, Matsushita.

* cited by examiner

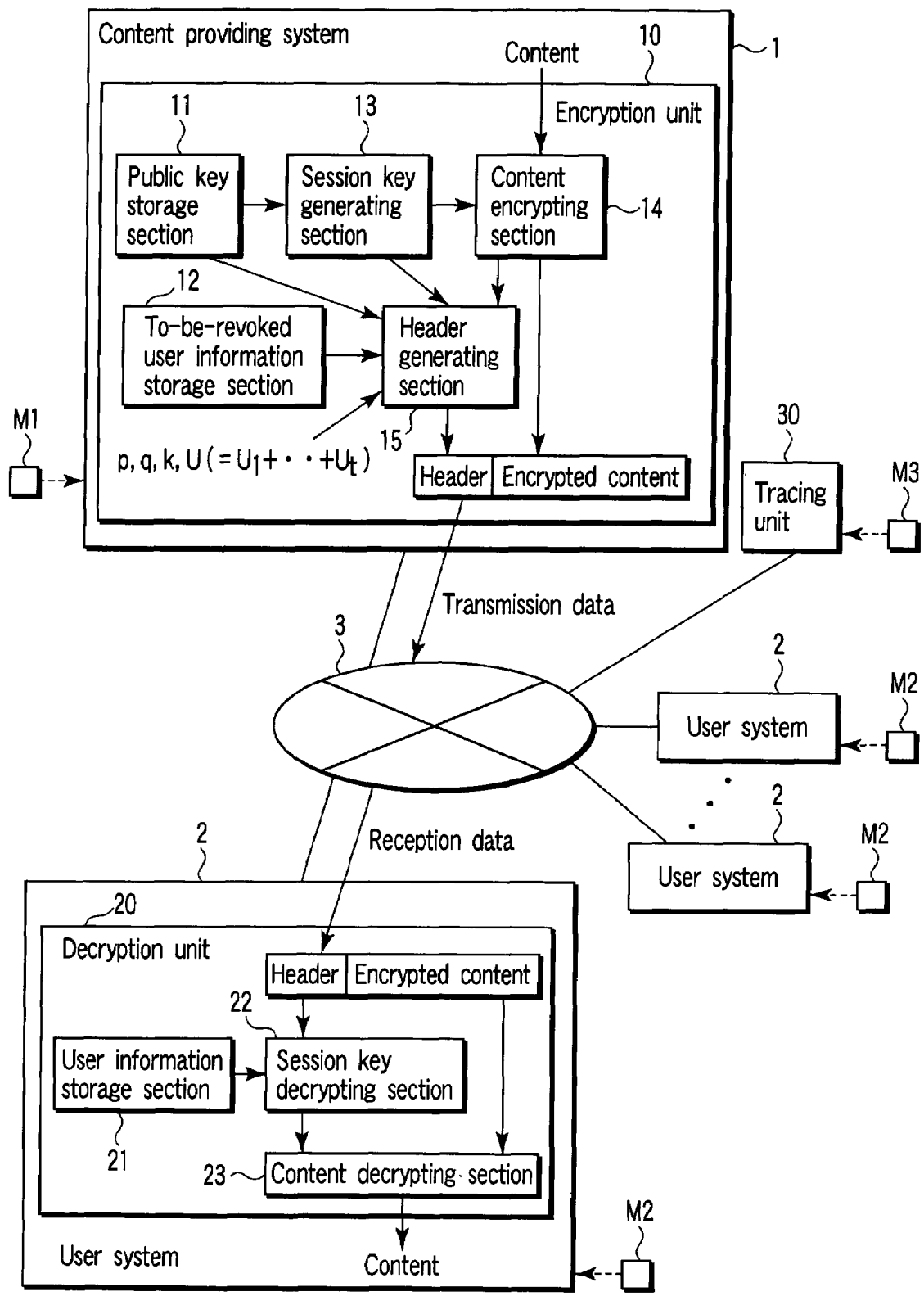
F I G. 1

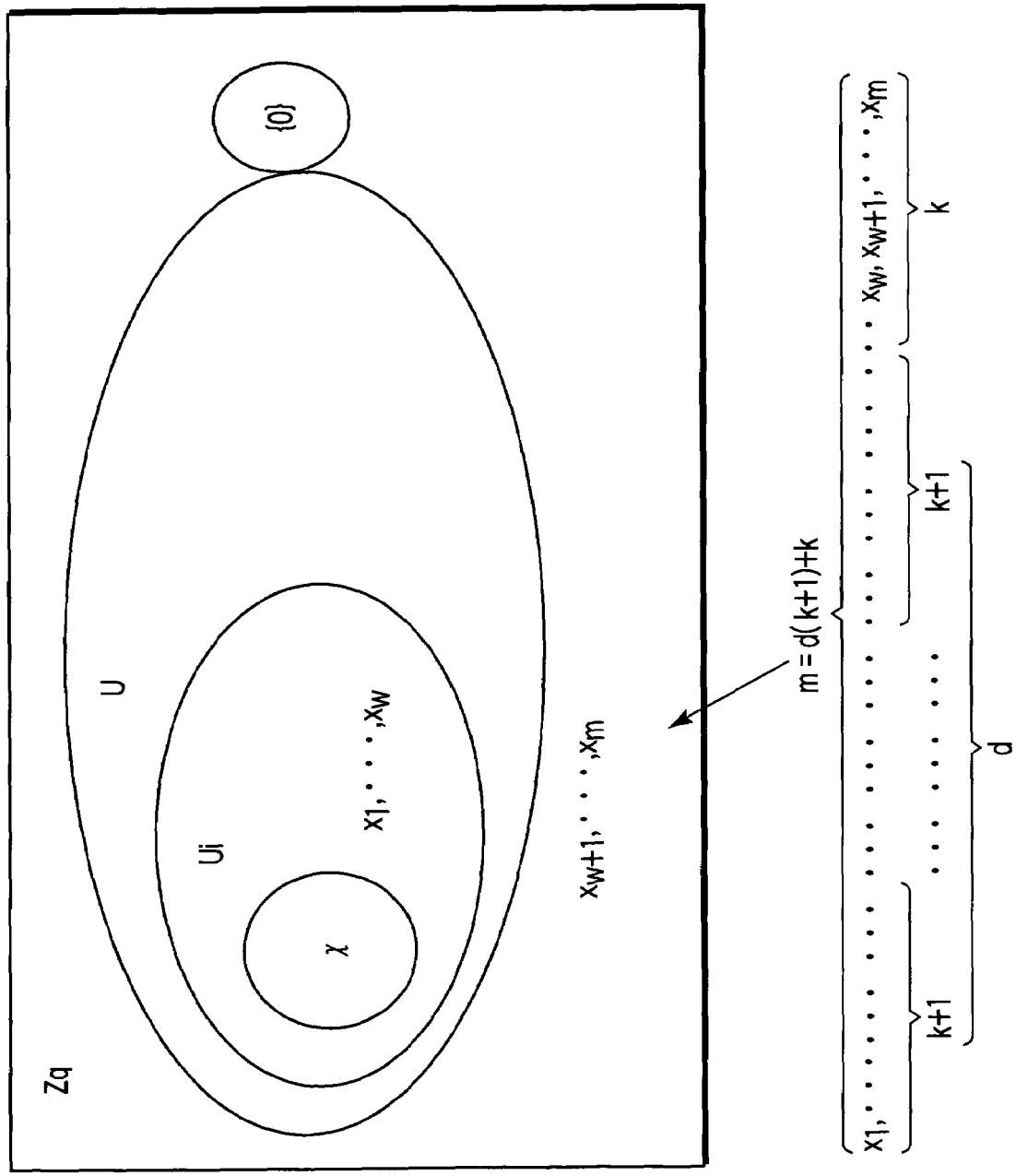
F I G. 7

CONTENT PROVIDING SYSTEM, USER SYSTEM, TRACING SYSTEM, APPARATUS, METHOD, AND PROGRAM

CROSS-REFERENCE TO RELATED APPLICATIONS

This application is based upon and claims the benefit of priority from prior Japanese Patent Applications No. 2004-013355, filed Jan. 21, 2004; and No. 2005-007815, filed Jan. 14, 2005, the entire contents of both of which are incorporated herein by reference.

BACKGROUND OF THE INVENTION

1. Field of the Invention

This invention relates to a content providing system, a user system, a tracing system, an apparatus, a method, and a program.

2. Description of the Related Art

In broadcast content delivery operations, the content of, e.g., television programs is encrypted and then delivered to users. The users decrypt the encrypted content with authorized decoders loaned by the distributor and watch the television programs from the obtained content. In broadcast content delivery operations, however, there are malicious authorized users (hereinafter, referred to as pirates) who clone decoders by copying the internal information (decryption key and the like) of an authorized decoder and enable encrypted content to be decrypted illegally.

As a deterrent to such piracy, various types of pirate identifying methods are known. Such pirate identifying methods are classified into two types: a first type includes methods based on a combinatorial construction and a second type includes methods based on an algebraic and number-theoretic construction.

A first pirate identifying method has the problem of having to make the transmission overhead very large to make sufficiently low the probability that an authorized user unrelated to the production of a cloned decoder (hereinafter, referred to as a pirate decoder) will be falsely detected as a pirate.

A second pirate identifying method has solved the above problem and achieved an efficient transmission overhead. Furthermore, in the second pirate identifying method, pirate identifying with revocation the decryption key of a specific user by applying a technique of secret sharing to a key distribution method has been proposed (e.g., see reference 1).

[Reference 1] M. Naor and B. Pinkas, "Efficient Trace and Revoke Schemes," In Proc. of Financial Cryptography '00, LNCS 1962, Springer-Verlag, February, 2000, pp. 1-20.

However, a plurality of decryption keys or data which has a function equivalent to decryption keys can be stored in a pirate decoder in conspiracy between pirates. The pirate decoder might be subjected to black-box tracing. In black-box tracing, a pirate is identified by observing only the input and output of the pirate decoder without physically opening the decoder.

In this case, in the second pirate identifying method, the number of tests needed for black box tracing is exponential, which causes the problem of making black box tracing impractical. Specifically, a tracer who does black box tracing assumes a candidate for a pirate (hereinafter, referred to as a suspect) and checks whether the suspect's decryption key is held in the pirate decoder. The check is intended for all of the sets of possible suspects and is made on a set basis. The reason is that a single key generation polynomial f(x) is used as expressed by the following equation and therefore there is an upper limit to the number of decryption keys (the number of suspects) that can be revoked at a time:

$$f(x)=a_0+a_1 \cdot x+a_2 \cdot x^2+\ldots+a_k \cdot x^k$$

If the total number of users is n and the maximum number of pirates in a coalition is k, such black box tracing requires as many suspect sets as $_nC_k=n!/\{k!(n-k)!\}$ to be checked and therefore this is practically impossible as described above.

To overcome this problem, the technique for revoking decryption keys flexibly using a plurality of key generating polynomials (e.g., see reference 2). Here, "flexibly" means that there is no upper limit to the number of decryption keys that can be revoked.

[Reference 2] T. Matsushita, "A Flexibly Revocable Key-Distribution Scheme for Efficient Black-Box Tracing," In Proc. of International Conference on Information and Communications Security '02, LNCS 2513, Springer-Verlag, December 2002, pp. 197-208.

In reference 2, however, since a technique of secret sharing has been applied to the key distribution method, the intention of each input (or an assumed suspect) is known by a pirate decoder during black box tracing. If the pirate decoder is ingenious, it reads the intention of the input and operates so as to prevent the pirate from being traced, thereby thwarting black box tracing. This raises the following problem: a pirate cannot be identified or an innocent user will be falsely charged.

As described above, in the conventional pirate identifying methods, when black box tracing is done, the intention of each input is known by a pirate decoder. This causes the following problem: an ingenious pirate decoder thwarts black box tracing.

BRIEF SUMMARY OF THE INVENTION

An object of the present invention is to provide a content providing system, a user system, a tracing system, an apparatus, a method, and a program which prevent the intention of an input from being known by a pirate decoder in black box tracing and enables a pirate to be surely traced from an ingenious pirate decoder.

According to a first aspect of the present invention, there is provided a content providing system which provides encrypted content and header information for decrypting the encrypted content to user systems, the content providing system comprising: a content encrypting device configured to encrypt content by use of a session key and obtain the encrypted content; a decryption key generating device configured to generate a decryption key unique to each of the user systems and which includes a dividing portion configured to divide a group of user identification information of the user systems into one or more sub-groups, an assigning portion configured to assign a different key generation polynomial to each of the sub-groups, and a substituting device configured to generate a decryption key of a user system by substituting the user identification information of the user system in the key generation polynomial assigned to the sub-group to which the user identification information of the user system belongs; a header information generating device configured to encrypt the session key by use of an encryption key in such a manner that the session key can be obtained by use of a decryption key assigned to a user system and generate header information including the obtained encrypted session key and one or more values based on the user identification information about at least one of the user systems that are permitted to obtain the session key; and a transmission device configured to transmit the encrypted content and the header information to each of the user systems.

According to a second aspect of the present invention, there is provided a user system which decrypts encrypted content provided by a content providing system, the user system comprising: a receiving device which receives, from the content providing system, encrypted content capable of being decrypted by use of a session key and header information that includes a session key encrypted in such a manner that the session key can be obtained by use of a decryption key assigned to the user system and one or more values based on the user identification information about at least one of the user systems that are permitted to obtain the session key; a session key decrypting device configured to decrypt a session key from the header information on the basis of the decryption key and which uses as the decryption key the value obtained by substituting the user identification information of the user system in the key generation polynomial assigned to the sub-group to which user identification information of the user system belongs; and a content decrypting device configured to decrypt the encrypted content on the basis of the decrypted session key.

According to a third aspect of the present invention, there is provided a tracing system which identifies at least one of one or more user systems which are used to build a pirate user system, the tracing system comprising: a header information generating device configured to generate header information that includes a session key encrypted by an encryption key in such a manner that the session key cannot be obtained by use of a decryption key assigned to each of one or more user systems and the session key can be obtained by use of a decryption key assigned to each of the other user systems and one or more values based on the user identification information about at least one of the user systems permitted to obtain the session key, a decryption key being a value obtained by substituting user identification information of a user system in a key generation polynomial assigned to a sub-group to which the user identification information of the user system belongs; an inputting device configured to input the header information to the pirate user system to be checked and acquiring the result of the decryption of the session key by the pirate user system; and an identifying device configured to identify at least one of the one or more user systems which are used to build the pirate user system, on the basis of the user identification information of the one or more user systems which are disabled to obtain the session key in the header information inputted to the pirate user system and the result of the decryption of the session key by the pirate user system.

According to a fourth aspect of the present invention, there is provided a key generation method used in a content providing system which provides encrypted content and header information to decrypt the encrypted content to the plurality of user systems, the key generation method comprising: generating an encryption key common to the plurality of user systems on the basis of a plurality of polynomial coefficients; and generating a decryption key of each of the plurality of user systems on the basis of the plurality of polynomial coefficients, which further includes dividing into a plurality of sub-groups a group to which a plurality of pieces of user identification information to identify a plurality of user systems separately belong, assigning the leaves to the sub-groups in a one-to-one correspondence in a tree structure which starts from a root, passes through zero or more nodes, and reaches a plurality of leaves, assigning key generation polynomials having the polynomial coefficients and differing from one another to part of or all of the root, the nodes, and the leaves in the tree structure, assigning at least one of all of the key generation polynomials assigned to the tree structure in units of one or more sub-groups, and substituting user identification information of a user system into at least one key generation polynomial for a sub-group to which the user identification information of the user system belongs and determining a set of the at least one obtained value to be a decryption key of the user system.

In the first to fourth aspects of the present invention, the header information includes one or more values based on the user identification information about at least one of the user systems that are permitted to obtain the session key and does not explicitly include the user identification information of the user systems. Therefore, in black box tracing, the intention of the input is not known by a pirate decoder. Even from an ingenious pirate decoder which reads the intention of the input and attempts to prevent the pirate from being identified the pirate can be traced reliably.

While the above inventions have been expressed in the category of system, it goes without saying that they may be expressed in any category, such as apparatus, method, computer-readable storage medium, or program. Furthermore, of course, the whole system may be expressed in another category. In addition, a part of the system may be extracted and expressed in another category.

BRIEF DESCRIPTION OF THE SEVERAL
VIEWS OF THE DRAWING

FIG. 1 is a schematic diagram showing a data communication system to which a content providing system and a user system according to a first embodiment of the present invention are applied;

FIG. 7 is a diagram to help explain the processing of a header generating section in the first embodiment;

DETAILED DESCRIPTION OF THE INVENTION

Hereinafter, referring to the accompanying drawings, embodiments of the present invention will be explained.

FIRST EMBODIMENT

Figure 2:
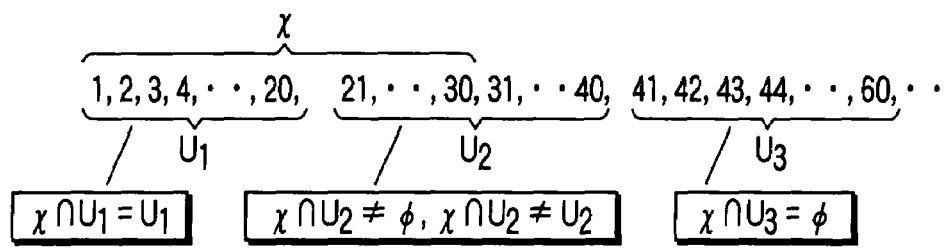
FIGS. 2 and 3 are schematic diagrams to help explain sub-groups of user sets in the first embodiment.
Figure 3:
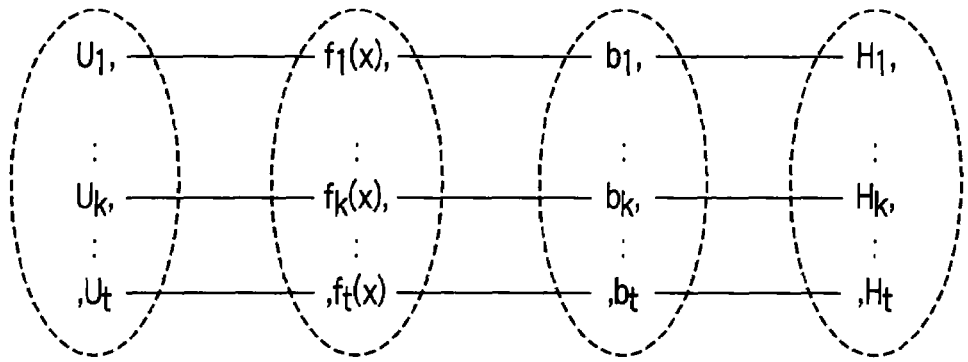
Figure 4:
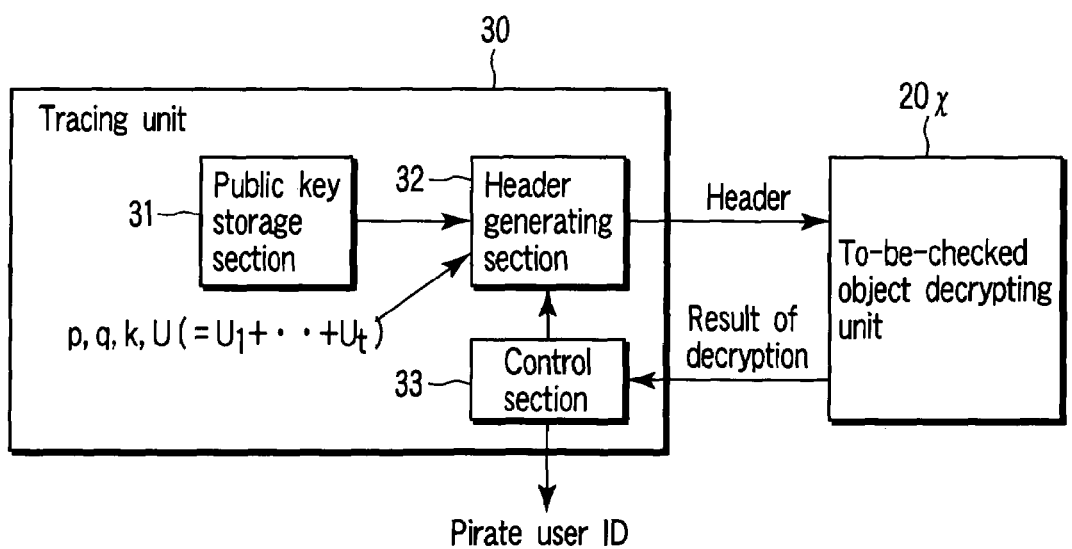
FIG. 4 is a schematic diagram showing the configuration of a tracing system in the first embodiment.

FIG. 1 is a schematic diagram showing a data communication system to which a content providing system and a user system according to a first embodiment of the present invention are applied. FIGS. 2 and 3 are schematic diagrams to help explain sub-groups of user sets in the first embodiment. FIG. 4 is a schematic diagram showing the configuration of a tracing system in the first embodiment.

In the data communication system, the content providing system 1 with an encryption unit 10 is connected to an n number of user systems 2 each having a decryption unit 20 via a network 3 as shown in FIG. 1. In addition, a tracing unit 30 is connected to the network 3. The systems 1, 2 and the unit 30 may be realized in hardware and/or software. When they are realized in software, the corresponding programs have been installed in the computers of the systems 1, 2, and the unit 30 from storage media M1 to M3, respectively. The individual programs have been stored in the computer-readable storage media M1 to M3. Each of the programs has program codes which cause the computers to perform the functions of the systems 1, 2 and the unit 30. In the embodiments described below, the system 1, 2 and the unit 30 may be realized similarly by the programs.

The content providing system 1 is for encrypting content and broadcasting or multicasting the encrypted content.

The n number of user systems 2 are for receiving the encrypted content broadcast or multicast by the content providing system 1 via the network 3 and decrypting the encrypted content.

Although only one content providing system 1 is shown in FIG. 1, there may be more than one content providing system 1.

Moreover, one node may have the function of the content providing system 1 and the function of the user system 2. In addition, each of the nodes may have the function of the content providing system 1 and the function of the user system 2, thereby enabling encrypted communication between them.

The network 3 may be either a wired network or a wireless network. The network 3 may be a network using both a wired network and a wireless network. Moreover, the network 3 may be a two-way network or a one-way network. Furthermore, the network 3 may be on-line or off-line, that is, data may be conveyed via storage media.

Next, the encryption unit 10 installed in the content providing system 1 will be explained.

The encryption unit 10 includes a public key storage section 11, a to-be-revoked user information storage section 12, a session key generating section 13, a content encrypting section 14, and a header generating section 15.

The public key storage section 11 is a memory which stores a public key and which can be read from the session key generating section 13 and header generating section 15.

The to-be-revoked user information storage section 12 is a memory which stores information about the users to be revoked (including user IDs) and which can be read from the header generating section 15.

The session key generating section 13 has the function of generating a session key on the basis of the public key in the public key storage section 11.

The content encrypting section 14 has the function of encrypting the content to be provided on the basis of the session key generated by the session key generating key 13 and producing the encrypted content. The encrypted content can be decrypted on the basis of the session key.

The header generating section 15 has the function of generating header information on the basis of the public key, (information providing the basis of) session key, to-be-revoked user information (when there are users to be revoked), and other necessary parameters (such as parameters p, q, k, U ($=U_1+ \ldots +U_r$) in a subsequent example). The user set U is a union of sub-groups $U_1$ to $U_r$.

Specifically, the header generating section 15 has the function of encrypting the session key by use of the public key and generating three types of header information.

First header information relates to users to be revoked and does not include any encrypted session key.

Second header information relates to users to be revoked and users to be validated. The second header information includes the encrypted session key and one or more of the values based on user identification information about at least one of the user systems that are permitted to obtain the session key. The encrypted session key can be decrypted on the basis of the decryption key.

Third header information relates to users to be validated and includes an encrypted session key. The third header information does not include a value based on user identification information about the users to be validated. However, the third header information may include a value based on the users to be validated.

It is assumed that the content providing system 1 includes various units as needed, including a header information and encrypted content communication interface, a unit which stores content, a unit to which content is input, and a decryption key generating unit (not shown). From the viewpoint of reducing the amount of data, it is desirable that, when transmitting each piece of header information to a plurality of sub-groups, the content providing system 1 should commoditize the common parts of the individual pieces of header information and transmit the commoditized information. The present invention is not limited to this. The common parts may not be commoditized.

The decryption key generating unit is for generating a decryption key assigned to each user system. The decryption key generating unit has the function of dividing a group of user identification information of the user systems into sub-groups, the function of assigning a different key generation polynomial to each of the sub-groups, and the function of generating a decryption key of a user system by substituting user identification information of the user system in the key generation polynomial assigned to the sub-group to which the user identification information of the user system belongs.

Specifically, the user's decryption key is generated by substituting a user ID (a positive integer selected from a specific range (e.g., consecutive numbers from 1 to n)) in key generation polynomials. At this time, as shown in FIGS. 2 and 3, the set of users is divided into sub-groups and the key generation polynomials are assigned to the individual sub-groups as follows.

For example, to sub-group $U_1$, $f_1(x) = a_0 + b_1 \cdot x + a_2 \cdot x^2 + a_3 \cdot x^3 + \ldots + a_k \cdot x^k$ is assigned.

To sub-group $U_2$, $f_2(x) = a_0 + a_1 \cdot x + b_2 \cdot x^2 + a_3 \cdot x^3 + \ldots + a_k \cdot x^k$ is assigned.

To sub-group $U_3$, $f_3(x) = a_0 + a_1 \cdot x + a_2 \cdot x^2 + b_3 \cdot x^3 + \ldots + a_k \cdot x^k$ is assigned.

Similarly, to sub-group $U_i$, the following equation $f_i(x)$ is assigned:

$f_i(x) = a_0 + a_1 \cdot x + a_2 \cdot x^2 + \ldots + a_{i-1} \cdot x^{i-1} + b_i \cdot x^i + a_{i+1} \cdot x^{i+1} + \ldots + a_{k-2} \cdot x^{k-2} + a_{k-1} \cdot x^{k-1} + a_k \cdot x^k$ where $a_0$ to $a_{i-1}$, $a_{i+1}$ to $a_k$ are polynomial coefficients and $b_i$ is a polynomial coefficient unique to the i-th sub-group. The above assignment method is one example. For instance, a key generation polynomial $f_i(x)$ may be assigned at random and uniquely instead of being caused to correspond to sub-group number i. There may be a key generation polynomial $f_j(x)$ which is not assigned to any sub-group.

As described above, different key generation polynomials are assigned to the individual sub-groups (in the above example, the key generation polynomials differ in a part ($b_i$) of the polynomial coefficients). Using the key generation polynomial assigned to the sub-group to which the user ID belongs, a decryption key for the user ID is generated.

This makes it possible not only to revoke the decryption keys for any number of users but also to reduce the number of tests needed for black box tracing.

It is assumed that the decryption key obtained by substituting the user ID assigned to the user system 2 in the key generation polynomial assigned to the sub-group to which the user ID belongs has been given to the user system 2 by the content provider 1 or a trusted third party and the user system 2 has held the decryption key.

FIGS. 2 and 3 show an example of a grouping method. Other various grouping methods are possible.

In the above explanation, the user ID is a positive integer selected from a specific range (e.g., consecutive numbers from 1 to n). Instead of setting the user ID as a positive integer, a positive integer selected from a specific range may be assigned uniquely to the user ID, such as alphanumeric characters, and a decryption key may be computed on the basis of the positive integer assigned uniquely to the user ID and the corresponding key generation polynomial.

Next, the decryption unit 20 installed in the user system 2 will be explained.

The decryption unit 20 includes a user information storage section 21, a session key decrypting section 22, and a content decrypting section 23 as shown in FIG. 1.

The user information storage section 21 is a memory which stores the necessary parameters for decryption (in an example explained later, parameters p, q, k), a sub-group ID to which the system 2 belongs, a user ID assigned to the system 2, and a decryption key corresponding to the user ID. The user information storage section 21 can be read from the session key decrypting section 22. The decryption key is a value obtained by substituting the user ID in the key generation polynomial assigned to the sub-group to which the user ID belongs.

The session key decrypting section 22 has the function of, when receiving the encrypted content and header information from the content providing system 1, obtaining (or decrypting) a session key from the header information on the basis of the decryption key in the user information storage section 21.

The content decrypting section 23 has the function of decrypting the encrypted content received from the content providing system 1 on the basis of the session key obtained (or decrypted) from the session key decrypting section 22.

It is assumed that the user system 2 includes various units as needed, including a communication interface for receiving the encrypted content and header information from the content providing system 1, a unit for storing content, and a unit for displaying content.

Next, the tracing unit 30 will be explained by reference to FIG. 4.

The tracing unit 30 includes a public key storage section 31, a header generating section 32, and a control section 33.

The public key storage section 31, which is a memory for storing a public key, can be read from the header generating section 32.

The header generating section 32 has the function of generating header information on the basis of the public key and other necessary parameters (e.g., parameters p, q, k, U ($=U_1+\ldots+U_t$) in an example explained later) according to a set of to-be-revoked users specified by the control section 33 and the function of inputting the header information to an object to be checked. The control section 33 may generate (information providing the basis of) the session key and instruct the header generating section 32. Alternately, the header generating section 32 may generate the session key and informs the control section 33 of the session key. The header information is generated so as to include the session key encrypted by the public key in such a manner that the session key cannot be obtained by use of a decryption key assigned to each of one or more users and the session key can be obtained by use of a decryption key assigned to each of the other users and one or more of the values based on user identification information of the user systems that are permitted to obtain the session key.

The control section (identifying device) 33 supervise the overall control of the tracing unit 30. The control section 33 has the function of identifying at least one of one or more user systems which are used to build a pirate user system, on the basis of the user identification information of the one or more user systems which are disabled to obtain the session key in the header information inputted to the pirate user system and the result of the decryption of the session key by the pirate user system.

Specifically, the control section 33 has the function of informing the header generating section 32 of (one or more) user IDs to be revoked (that is, a set $\chi$ of users to be revoked), the function of inputting the session key decrypted by a to-be-checked object decrypting unit $20\chi$ and checking whether the correct session key has been obtained, and the function of identifying the user ID of a pirate by repeating a similar process, while changing the set of users to be revoked, and taking the results of the determinations into consideration.

While the control section 33 determines the result of the decryption of the session key by the to-be-checked object decrypting unit $20\chi$, this invention is not limited to this. The content encrypted using the session key and the header information may be input to the to-be-checked decrypting unit $20\chi$ and the result of the decryption of the content by the to-be-checked decrypting unit $20\chi$ may be determined.

Furthermore, the tracing unit 30 may be installed in the content providing system 1 or in a unit independent of the content providing system 1. In addition, the tracing unit 30 may or may not have the function of connecting with the network 3.

Figure 5:
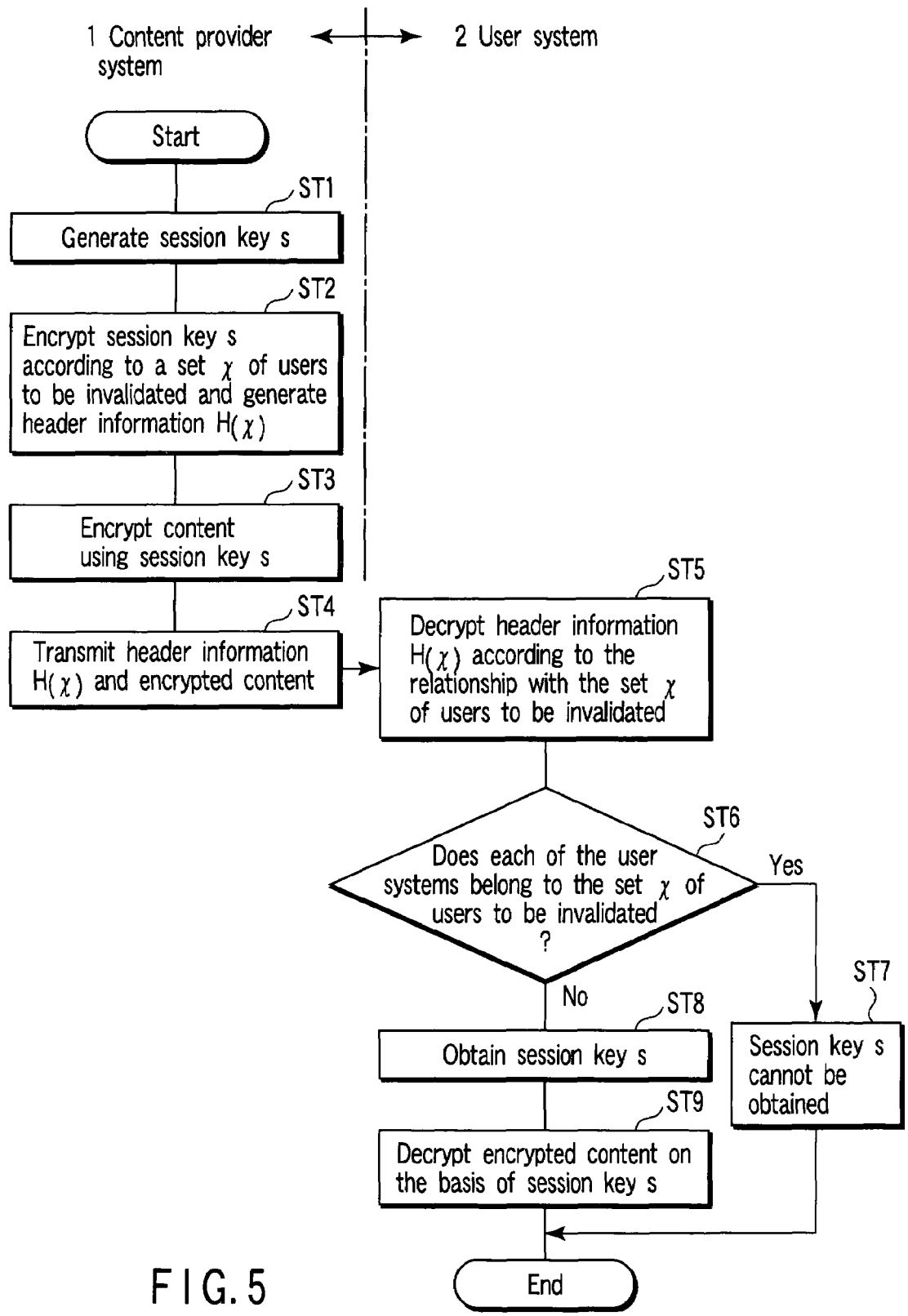
FIG. 5 is a flowchart to help explain the entire operation in the first embodiment.

Next, the operation of the network communication system configured as described above will be explained. FIG. 5 is a flowchart to help explain the entire operation of the network communication system.

Suppose each user system 2 is assigned a unique user ID.

The content providing system 1 generates a specific session key (a single key) (ST1), encrypts the session key based on a set of users to be revoked, and generates header information $H(\chi)$ (ST2).

Then, the content providing system 1 encrypts content using the session key (ST3), and broadcasts or multicasts the header information $H(\chi)$ and the encrypted content (ST4). The content providing system 1 may multicast as many pieces of header information (a part of $H(\chi)$) as needed for a sub-group to the sub-group.

Step ST2 and step ST3 may be carried out in reverse order or at the same time. When the session key is not changed each time, ST1 may be omitted (the preceding session key is used).

Receiving the header information and encrypted content, each of the user systems 2 decrypts the header information based on the relationship with the set χ of users to be revoked, on the basis of its own user ID and sub-group ID (ST5).

If each of the user systems 2 belongs to the set χ of users to be revoked (ST6), it cannot get the session key (ST7). Conversely, if it does not belong to the set χ of users to be revoked (ST6), it gets the session key (ST8) and decrypts the encrypted content using the session key (ST9).

As described in detail later, since the content providing system 1 generates header information based on the set χ of users to be revoked, it can revoke the decryption key flexibly. The revocation of the decryption key is achieved by encrypting the session key in such a manner that the session key is prevented from being obtained even by use of the decryption keys of the users to be revoked and the session key can be obtained by use of the decryption keys of the remaining users.

In broadcast content delivery, transmission data is generally encrypted using a single session key. A key distribution method means a method of encrypting the session key in such a manner that the session key can be obtained by use of the decryption key of each user.

Hereinafter, a key generation phase executed beforehand, an encryption phase in step ST2, and a decryption phase in steps ST5 to ST8 will be explained in detail.

First, parameters are defined.

Let the total number of users be n and the maximum number of pirates in a coalition be k.

It is assumed that p and q are prime numbers and that p−1 can be divided by q and q is equal to or larger than n+k+1.

Let $Zq = \{0, 1, \ldots, q-1\}$

Let $Zp^* = \{1, \ldots, p-1\}$

Suppose Gq is a sub-group of Zp* and a multiplicative group whose order is q and g is a generator of Gq.

Let a set of user IDs (user numbers) (hereinafter, referred to as a user set) be U ($U \subseteq Zq - \{0\}$). Here, Zq−{0} means what is obtained by removing {0} from Zq. Let a set of users to be revoked (a set of users whose decryption keys are to be revoked) be χ. Here, p, q, and g are open to the public.

Hereinafter, suppose calculations are done over Zp*, unless otherwise specified.

(Key Generation Phase)

The content providing system 1 divides the user set U into t disjoint subsets (sub-groups). Let the t disjoint subsets be $U_1, \ldots, U_t$. $U_1, \ldots, U_t$ are open to the public. Parameters $a_0, \ldots, a_k, b_1, \ldots, b_t$ on which the public key is based are selected from Zq at random.

Next, the content providing system 1 calculates a public key e. The public key e is given by equation (1):

$$e = (g, y_{0,0}, \cdots, y_{0,k}, y_{1,1}, \cdots, y_{1,t}) \quad (1)$$
$$= (g, g^{a_0}, \cdots, g^{a_k}, g^{b_1}, \cdots, g^{b_t}).$$

Finally, the content providing system 1 calculates a decryption key $f_i(u)$ of the user ID=u belonging to a subset $U_i$ by substituting x=u in a key generation polynomial $f_i(x)$. Here, the key generation polynomial $f_i(x)$ is assigned to the subset $U_i$ to which user u belongs and is expressed as equation (2):

$$f_i(x) = a_0 + \sum_{j=1}^{k} a_{i,j} x^j \bmod q, \quad (2)$$

$$a_{i,j} = \begin{cases} a_j & (j \neq g(i)), \\ b_i & (j = g(i)), \end{cases}$$

$$g(i) = \begin{cases} i \bmod k & (i \not\equiv 0 (\bmod k)), \\ k & (i \equiv 0 (\bmod k)). \end{cases}$$

Figure 13:
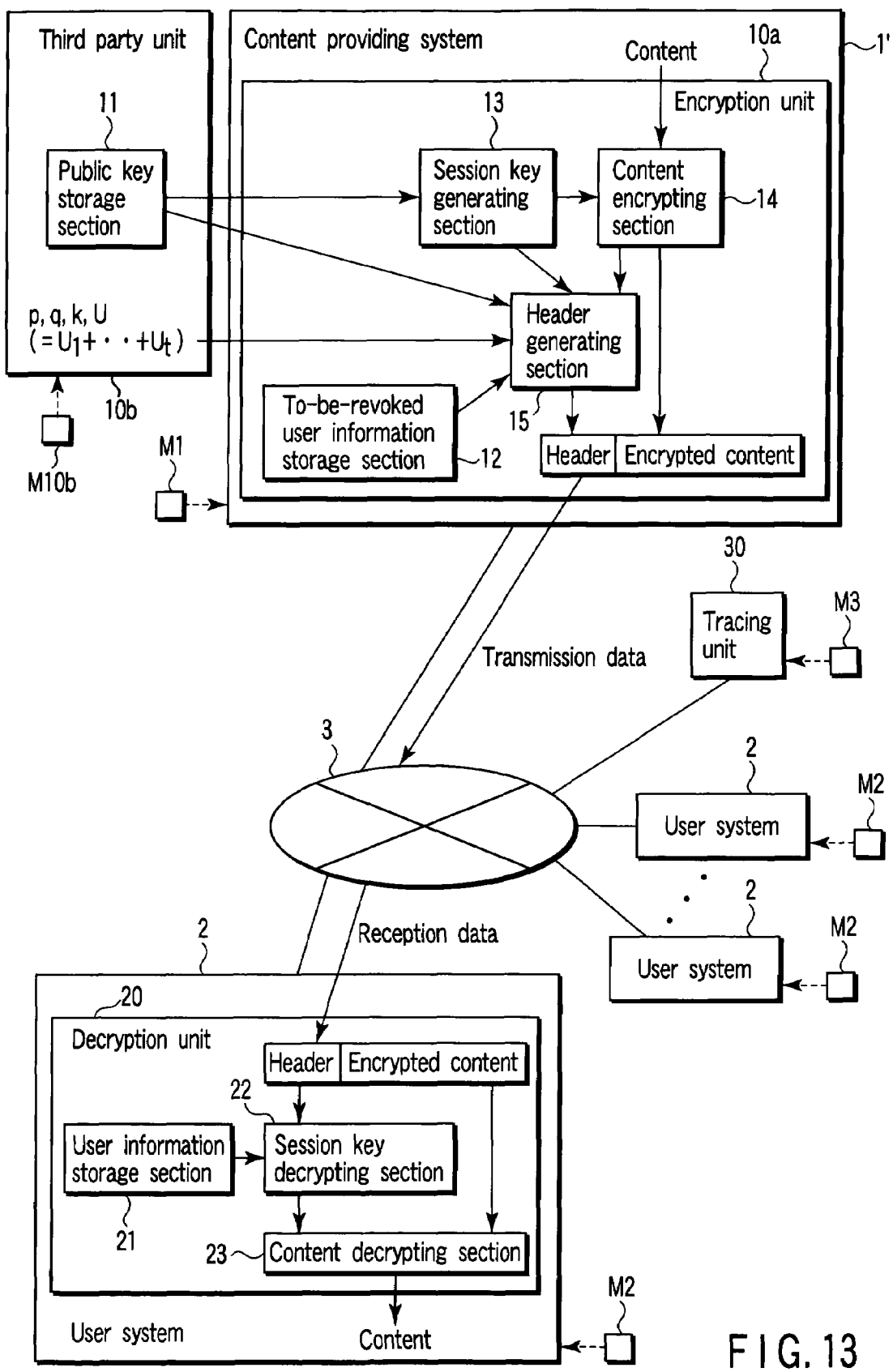
FIG. 13 is a schematic diagram showing a modification of the data communications system to which the content providing system and user system according to the first embodiment are applied.

The process in the key generating phase may be carried out by a reliable third party unit 10b other than the content provider system 1 as shown in FIG. 13. This holds true for the embodiments explained below.

(Encryption Phase)

The session key generating section 13 of the content providing system 1 selects a session key s from Gq at random. Then, the header generating section 15 selects random number r and calculates equation (3):

$$(\hat{h}, h_0, \cdots, h_k) = (g^r, sy_{0,0}^r, y_{0,1}^r, \cdots, y_{0,k}^r) \quad (3)$$
$$= (g^r, sg^{a_0 r}, g^{a_1 r}, \cdots, g^{a_k r})$$

The obtained $(\hat{h}, h_0, \ldots, h_k)$ is used later to calculate header information $H_1, \ldots, H_t$.

Figure 6:
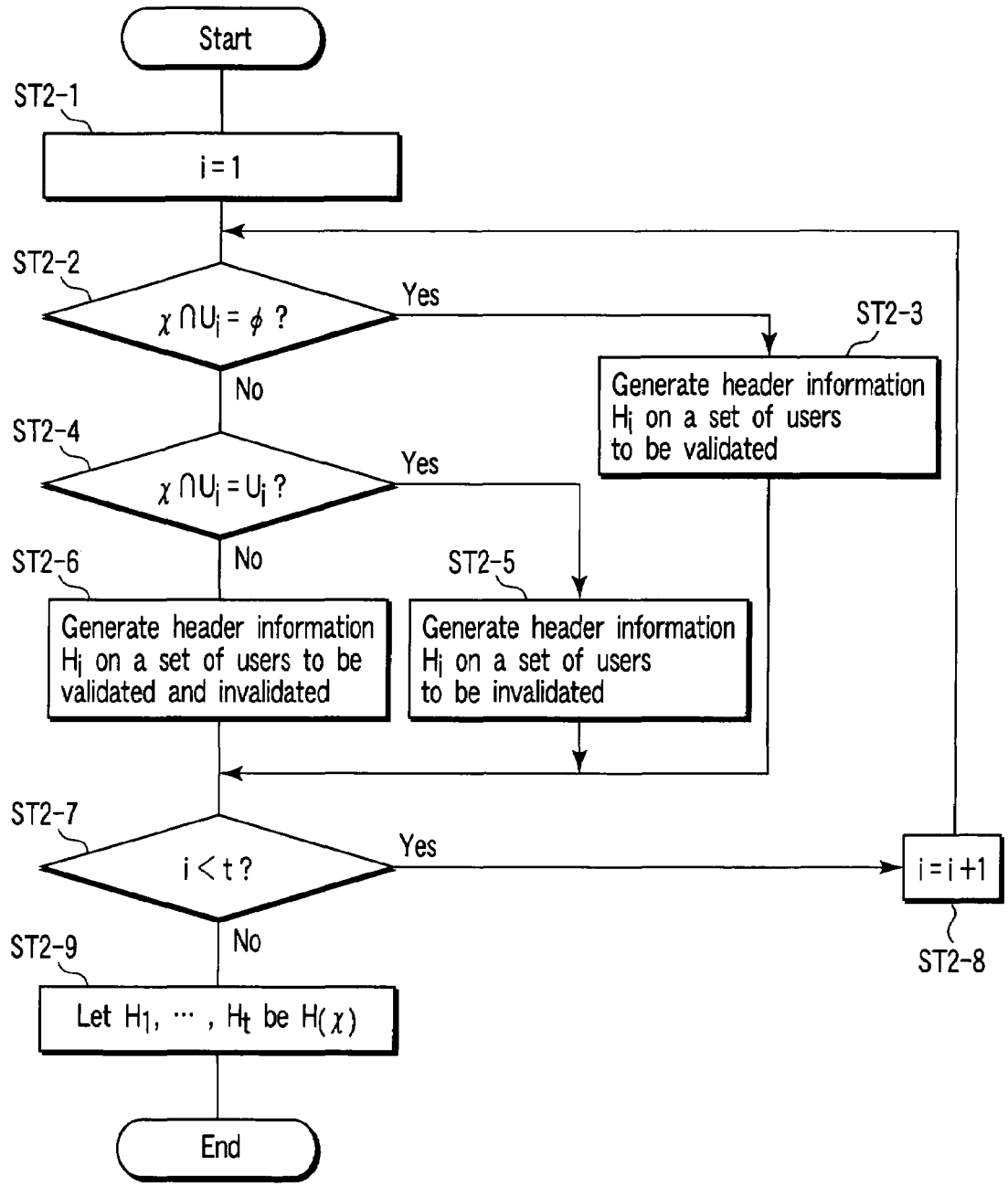
FIG. 6 is a flowchart to help explain the encryption phase operation in the first embodiment.

Next, the header generating section 15 repeats the following process for $1 \leq i \leq t$ as shown in FIG. 6, thereby computing $H_1, \ldots, H_t$ (ST2-1 to ST2-8).

The header generating section 15 determines whether an intersection of the set χ of users to be revoked and $U_i$ is an empty set (ST2-2).

A case where an intersection of χ and $U_i$ is an empty set will be explained. This is a case where none of the users belonging to $U_i$ are users to be revoked. For example, $U_3$ of FIG. 2 corresponds to this case. The header generating section 15 calculates $H_i$ using the following equation (4) (ST2-3):

$$\text{When } \chi \cap U_i = \phi, \quad (4)$$
$$H_i = (\hat{h}_i, h_{i,0}, \cdots, h_{i,k}),$$
$$\hat{h}_i = \hat{h}$$
$$h_{i,j} = \begin{cases} h_j & (j \neq g(i)), \\ y_{1,i}^r & (j = g(i)), \end{cases}$$

If the result of step ST2-2 has shown that an intersection of the set χ of users to be revoked and $U_i$ is not an empty set, the header generating section 15 determines whether an intersection of χ and $U_i$ is $U_i$ (ST2-4).

Here, a case where an intersection of χ and $U_i$ is $U_i$ will be explained. This is a case where all of the users belonging to $U_i$ are users to be revoked. For example, $U_1$ of FIG. 2 corresponds to this case. The header generating section 15 selects random number $z_i$ and calculates $H_i$ using equation (5) (ST2-5):

When $\chi \cap U_i = U_i$, (5)

$H_i = \left(\hat{h}_i, h_{i,0}, \cdots, h_{i,k}\right)$, $\hat{h}_i = \hat{h}$ $h_{i,j} = \begin{cases} h_j & (j \neq g(i)), \\ g^{z_i} & (j = g(i)), \end{cases}$ The equation (5) is used for calculating $H_i$ in a case where, when the decryption keys of all of the user systems 2 belonging to a specific sub-group $U_i$ are revoked, the value $b_i$ unique to the specific sub-group $U_i$ in the header information $H_i$ is replaced with an incorrect value $z_i$. The present invention is not limited to this. For instance, in the header information $H_i$ it may be prevented that the header information $H_i$ includes the element $h_{i,g(i)}$.

Since in the sub-group to be revoked, the information necessary to calculate the session key is not included in the header information, the correct session key cannot be obtained. In the other sub-groups, however, the correct session key can be obtained.

A case where step ST2-4 produces other results will be explained (ST2-4: NO). This is a case where at least one of the users belonging to $U_i$ is not a user to be revoked and at least one of them is a user to be revoked. This corresponds to, for example, $U_2$ of FIG. 2.

The header generating section 15 sets a subset obtained by removing the set $\chi$ of users to be revoked from $U_i$ as $\{x_1, \ldots, x_w\}$ as shown in FIG. 7. For example, in the case of $U_2$, it follows that $\{x_1, \ldots, x_{10}\} = \{31, \ldots, 40\}$ (w=10).

Then, the header generating section 15 finds an integer d that satisfies $d(k+1) \leq w \leq d(k+1)+k$ and gives $m=d(k+1)+k$.

Next, if $w<m$, the header generating section 15 selects $x_{w+1}, \ldots, x_m$ from $zq-(U+\{0\})$ at random. Here, $zq-(U+\{0\})$ means what is obtained by removing a union of $U$ and $\{0\}$ from $Zq$. In the above process, an (m'−w) distinct elements $x_{w+1}, \ldots, x_{m'}$ selected from $Zq$ (excluding the user set and $\{0\}$) may be added to a subset $\{x_1, \ldots, x_w\}$ obtained by removing the set $\chi$ of users to be revoked from $U_i$. In this case, calculations are done (with $w=m'$ in each of the above equations), regarding $\{x_1, \ldots, x_w, x_{w+1}, \ldots, x_{m'}\}$ as $\{x_1, \ldots, x_w\}$.

The header generating section 15 determines elements $c_1, \ldots, c_m$ of $Zq$ that satisfy equation (6) when $c_0=1$ for $1 \leq \alpha \leq m$.

$$\sum_{j=0}^{m} c_j x_\alpha^j = 0 \bmod q$$ (6)

Finally, the header generating section 15 selects random number $r_i$ and calculates $H_i$ using equation (7) (ST2-6):

$H_i = \left(\hat{h}_i, h_{i,0}, \cdots, h_{i,m}\right)$, (7)

$\hat{h}_i = g^{r_i}$, $h_{i,0} = h_0$, $h_{i,j} = \begin{cases} y_{0,z_j}^{r_i} y_{0,0}^{c_j(r-r_i)} & (z_j \neq g(i)), \\ y_{1,i}^{r_i} y_{0,0}^{c_j(r-r_i)} & (z_j = g(i)), \end{cases}$ $z_j = j \bmod (k+1)$.

In this case, the header information $H_i$ includes value $b_i$ unique to each of the sub-groups, and the values $\{c_0, \ldots, c_m\}$ based on a subset $\{x_1 \text{ to } x_w\}$ of users belonging to the sub-group. When revoking the decryption keys of one or more of all of the user systems 2 belonging to a specific sub-group, the header generating section 15 does not include the user IDs of the user systems 2 to be revoked in the subset $\{x_1, \ldots, x_w\}$.

When the individual user IDs $\{u_1, \ldots, u_w\}$ belonging to the subset are used as variables in a polynomial of degree m to form a second vector, the values $\{c_0, \ldots, c_m\}$ based on the subset is a first vector which meets the following equation in which the inner product of the second vector and the first vector is zero:

$(c_0, c_1, c_2, \ldots, c_m) \cdot (1, u_w, u_w^2, \ldots, u_w^m) = 0 \bmod q$ where $u_w$=any one of $u_1$ to $u_w$ Let $H_1, \ldots, H_t$ obtained in the repeated processes be header $H(\chi)$ (ST2-9). Since the header can be calculated using the public key e, anyone can operate the content providing system 1. The same ones of the elements constituting $H_1, \ldots, H_t$ obtained by the above repetitive processes are brought into one and commoditized in the header $H(\chi)$, thereby reducing transmission overheads. This holds true for the embodiments explained below.

The content providing system 1 transmits the content encrypted using the session key s and the header $H(\chi)$ to the user system 2 (ST3 to ST4).

(Decryption Phase)

Figure 8:
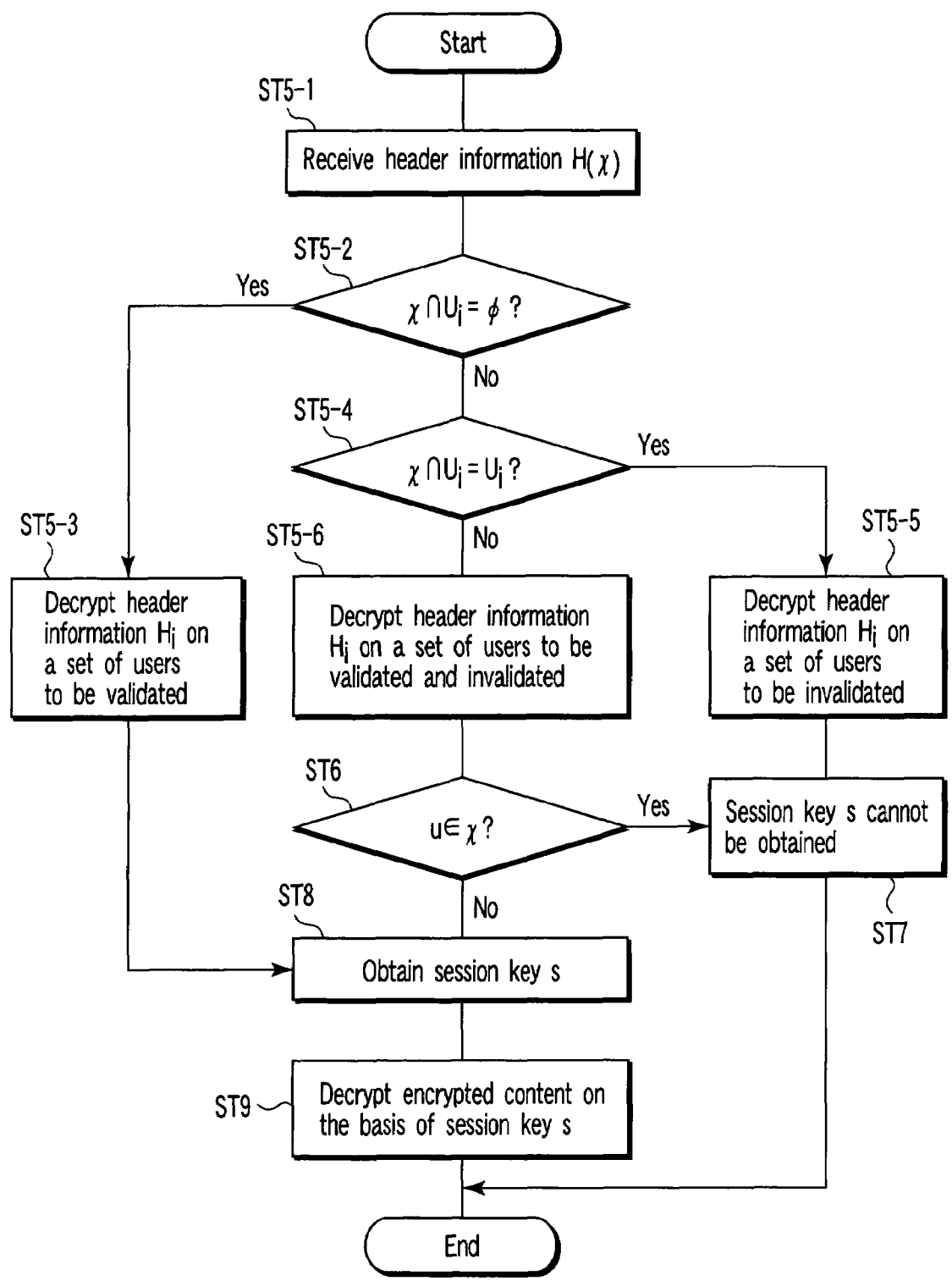
FIG. 8 is a flowchart to help explain the decryption phase operation in the first embodiment.

Consider user u belongs to the subset $U_i$. When receiving the header $H(\chi)$ (ST5-1) as shown in FIG. 8, the user system 2 with user ID=u calculates equation (8) using $H_i$:

$$D_i(u) = \left(h_{i,0} \times h_{i,1}^u \times \cdots \times h_{i,m}^{u^m}\right) / \hat{h}_i^{-f_i(u) \sum_{j=0}^{d} u^{j(k+1)}}$$ (8)

where $d=(m-k)/(k+1)$

Here, the result of decrypting a session key from the header information will be explained briefly.

The results of decryption at the session key decrypting section 22 of the user system 2 are separately explained, depending on whether an intersection of the set $\chi$ of users to be revoked and $U_i$ is an empty set (ST5-2), whether an intersection of the set $\chi$ of users to be revoked and $U_i$ is $U_i$ (ST5-4), or whether an intersection of the set $\chi$ of users to be revoked and Ui is neither an empty set nor $U_i$ (ST6). The session key decrypting section 22 of the user system 2 does not determine this. The decryption procedure is common to each case. The session key decrypting section 22 calculates equation (8) using $H_i$.

A case where an intersection of $\chi$ and $U_i$ is an empty set (m=k, d=0) (ST5-2: YES) will be explained. This is a case where none of the users belonging to $U_i$ are users to be revoked. For example, $U_3$ of FIG. 2 corresponds to this case. The session key decrypting section 22 calculates $D_i(u)$ using equation (9), thereby obtains a session key s (ST8):

When $\chi \cap U_i = \phi (m=k, d=0)$ (9)

$D_i(u) = \left(h_{i,0} \times h_{i,1}^u \times \cdots \times h_{i,k}^{u^k}\right) / \hat{h}_i^{-f_i(u)}$ $= \left(sy_{0,0}^r \times y_{0,1}^{ru} \times \cdots \times y_{1,i}^{ru^{g(i)}} \times \cdots \times y_{0,k}^{ru^k}\right) / g^{rf_i(u)}$ $= sg^{r\left(a_0 + \sum_{j=1}^{k} a_{i,j} u^j\right)} / g^{rf_i(u)}$ $= s$.

Here, a case where an intersection of the set $\chi$ of users to be revoked and $U_i$ is $U_i$ (m=k, d=0) (ST5-4: YES) will be explained. This is a case where all of the users belonging to $U_i$ are users to be revoked. For example, $U_1$ of FIG. 2 corresponds to this case.

In this case, it follows that $h_{i,g(i)} = g^{Z_i} \neq y_1^{r_i}$.

This gives $D_i(u) \neq s$ (ST5-5), with the result that the session key s is not obtained (ST7). At this time, since, as the information $h_{i,g(i)}$ from which the session key is calculated, the wrong value is set for the user IDs belonging to the sub-group $U_i$, the correct session key cannot be obtained.

Here, a case where an intersection of the set $\chi$ of users to be revoked and Ui is neither an empty set nor $U_i$ will be explained (ST5-4: NO). This is a case where at least one of the users belonging to $U_i$ is not a user to be revoked and at least one of them is a user to be revoked. For example, $U_2$ of FIG. 2 corresponds to this case.

$D_i(u)$ is further expressed as equation (10):

When an intersection of the set $\chi$ of users to be revoked and $U_i$ is neither an empty set nor $U_i$ ($\chi \cap U_i \neq \phi$, $\chi \cap U_i \neq U_i$), $$D_i(u) = \left(h_{i,0} \times h_{i,1}^u \times \cdots \times h_{i,m}^{u^m}\right) / h_i^{\tilde{f}_i(u) \sum_{j=0}^d u^{j(k+1)}} \quad (10)$$

$$= s \prod_{j=0}^d \left\{ y_{0,0}^{r_i} y_{0,0}^{c_j(k+1)(r-r_i)} \times \left(y_{0,1}^{r_i} y_{0,0}^{c_j(k+1)+1(r-r_i)}\right)^u \times \right.$$

$$\cdots \times \left(y_{1,i}^{r_i} y_{0,0}^{c_j(k+1)+g(i)(r-r_i)}\right)^{u^{g(i)}} \times \cdots \times$$

$$\left. \left(y_{0,k}^{r_i} y_{0,0}^{c_j(k+1)+k(r-r_i)}\right)^{u^k} \right\}^{u^{j(k+1)}} / g^{r_i f_i(u) \sum_{t=0}^d u^{t(k+1)}}$$

$$= \frac{sg^{r_i \left(a_0 + \sum_{j=1}^k a_{i,j} u^j\right) \sum_{t=0}^d u^{t(k+1)}} \times g^{a_0(r-r_i) \sum_{j=0}^{d(k+1)+k} c_j u^j}}{g^{r_i f_i(u) \sum_{t=0}^d u^{t(k+1)}}}$$

$$= sg^{a_0(r-r_i) \sum_{j=0}^m c_j u^j}.$$

When the user u is not a user to be revoked (ST6: NO), equation (11) holds, giving $D_i(u)=s$, which produces a session key s (ST8).

$$\Sigma_{j=0}^m c_j u^j = 0 \bmod q \quad (11)$$

When the user u is a user to be revoked (ST6: YES), equation (11) does not hold, preventing a session key s from being obtained (ST7).

(Tracing Phase)

An example of the procedure of a tracing algorithm will be explained. Before that, the tracing unit 30 and a pirate to be traced will be explained briefly. The tracing unit 30 is for, when a pirate decoder has been confiscated, doing black box tracing and identifying (the user ID of) a pirate whose decryption key is used to produce the pirate decoder.

When a pirate decoder is produced on the basis of an authorized decoding unit, a pirate decoder might be produced on the basis of only one decoding unit or of a plurality of decoding units. Pirates who give away the decoding units to the pirate decoder in the latter case are called colluders.

In the case of a pirate decoder produced on the basis of only one decoding unit, the same decryption key as that of the decoding unit can be used. In the case of a pirate decoder produced on the basis of a plurality of decoding units, any one of the same decryption keys as those of the plurality of decoders can be used. In the latter case, the session key can be obtained, unless the decryption keys of all of the colluders are revoked.

Even when a plurality of pirates collude, the tracing unit 30 can make a check more quickly than it checks a conventional nCk number of checks and identify at least one of the pirates in a coalition.

EXAMPLE OF PROCEDURE

Figure 9:
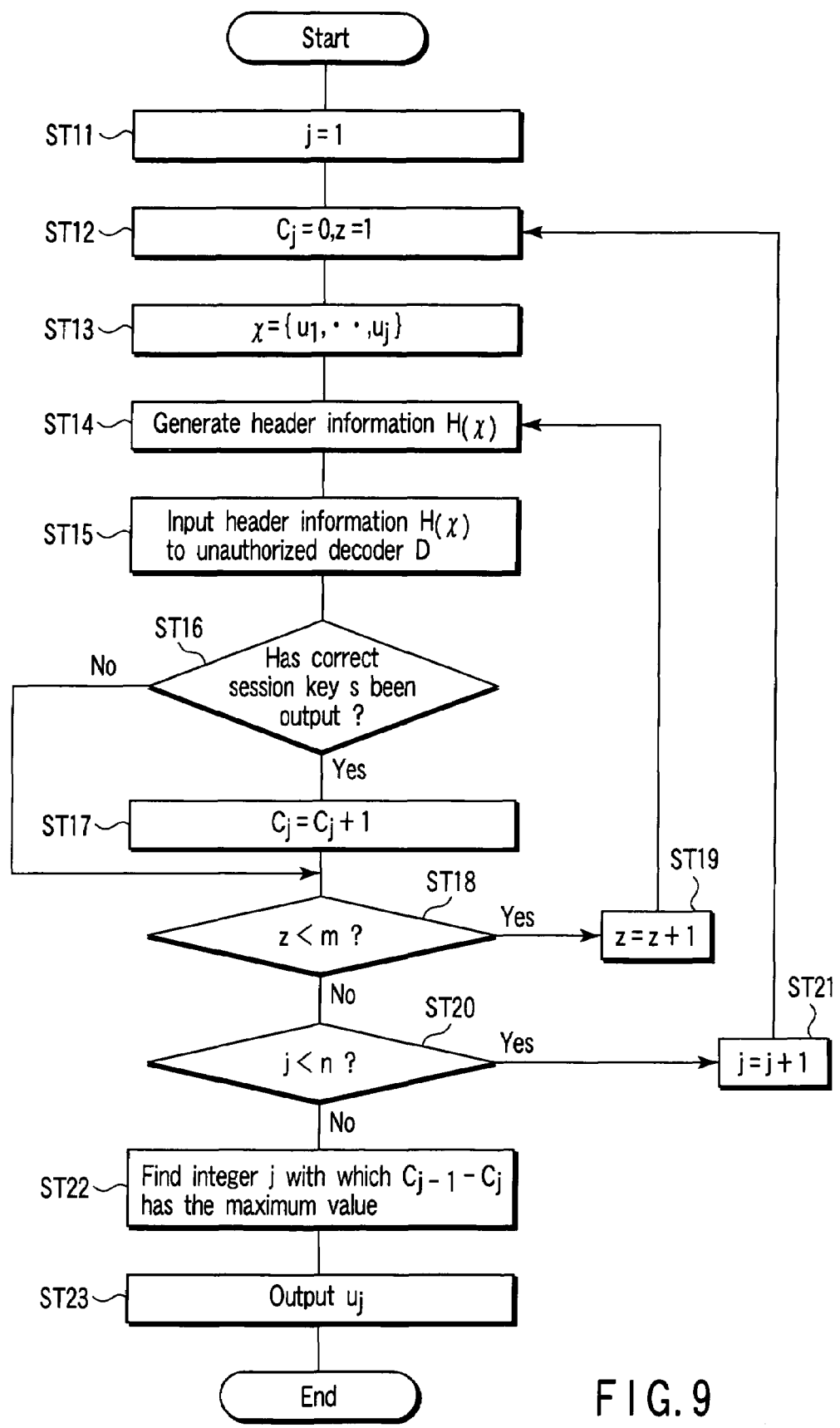
FIG. 9 is a flowchart to help explain the tracing phase operation in the first embodiment.

Wide variations are possible in the procedure of a concrete tracing program. The tracing program is not limited to what will be explained below. FIG. 9 is a flowchart to help explain the operation of the tracing phase by the tracing unit.

When a cloned decoder D has been confiscated, a pirate is identified by the following process.

Suppose the elements of subsets $U_1, \ldots, U_t$ are labeled using equation (12):

$$U_1 = \{u_1, \cdots, u_{d1}\} \quad (12)$$

$$U_2 = \{u_{d1+1}, \cdots, u_{d1+d2}\}$$

$$\vdots$$

$$U_t = \{u_{\sum_{j=1}^{t-1} d_j + 1}, \cdots, u_{\sum_{j=1}^t d_j} (= u_n)\}.$$

The tracing unit 30 carries out the following processes for j=1, ..., n (ST11 to ST21). The control section 33 substitutes the number of correct decryptions $C_j=0$ and the number of times the same set $\chi$ of users to be revoked was checked z=1 and repeats the following processes m times (ST12).

The control section 33 sets the set of users to be revoked as $\chi = \{u_1, \ldots, u_j\}$ (ST13) and controls the header generating section 32, thereby generating header $H(\chi)$ (ST14). The header generating method is the same as that explained in the encryption phase. In the method, random numbers are selected at random each time.

When the header generating section 32 inputs header $H(\chi)$ into a pirate decoder D (ST15), the control section 33 observes the output of the pirate decoder D.

At this time, the control section 33 determines whether the pirate decoder D has output a correct session key s (ST16). If the pirate decoder D has output the correct session key s (ST16: YES), the control section 33 increments $C_j$ by 1 (ST17). It the pirate decoder D has not output the correct session key s (ST16: NO), the control section 33 does not change the value of $C_j$.

If the pirate decoder D outputs only the decrypted content, the control section 33 observes whether the content has been decrypted correctly. If the content has been decrypted correctly, the control section 33 increments $C_j$ by 1. If the content has not been decrypted correctly, the control section 33 prevents the value of $C_j$ from changing.

In any case, after $C_j$ has been updated, the control section 33 determines whether the number of checks z is smaller than an m number of times (ST18). If it is smaller than an m number of times, the control section 33 increments z by 1 (ST19) and returns to step ST14, where the control section 33 repeats the check.

If the result of the determination in step ST18 has shown that the number of checks z is not smaller than an m number of times, the control section 33 determines whether the user number j to be revoked is smaller than the total number n of users (ST20). If the user number j is smaller than n, the control section 33 increments j by 1 (ST21) and returns to step ST12, where the control section 33 repeats the check.

If the result of the determination in step ST20 has shown that the user number j to be revoked is not smaller than the total number n of users, the control section 33 ends the check. Then, the control section 33 calculates $C_{j-1}-C_j$ for $j=1, \ldots, n$. If the control section 33 finds an integer j with which $C_{j-1}-C_j$ has the maximum value (ST22), it determines $u_j$ to be a pirate and outputs the user ID of the pirate (ST23).

Figure 10:
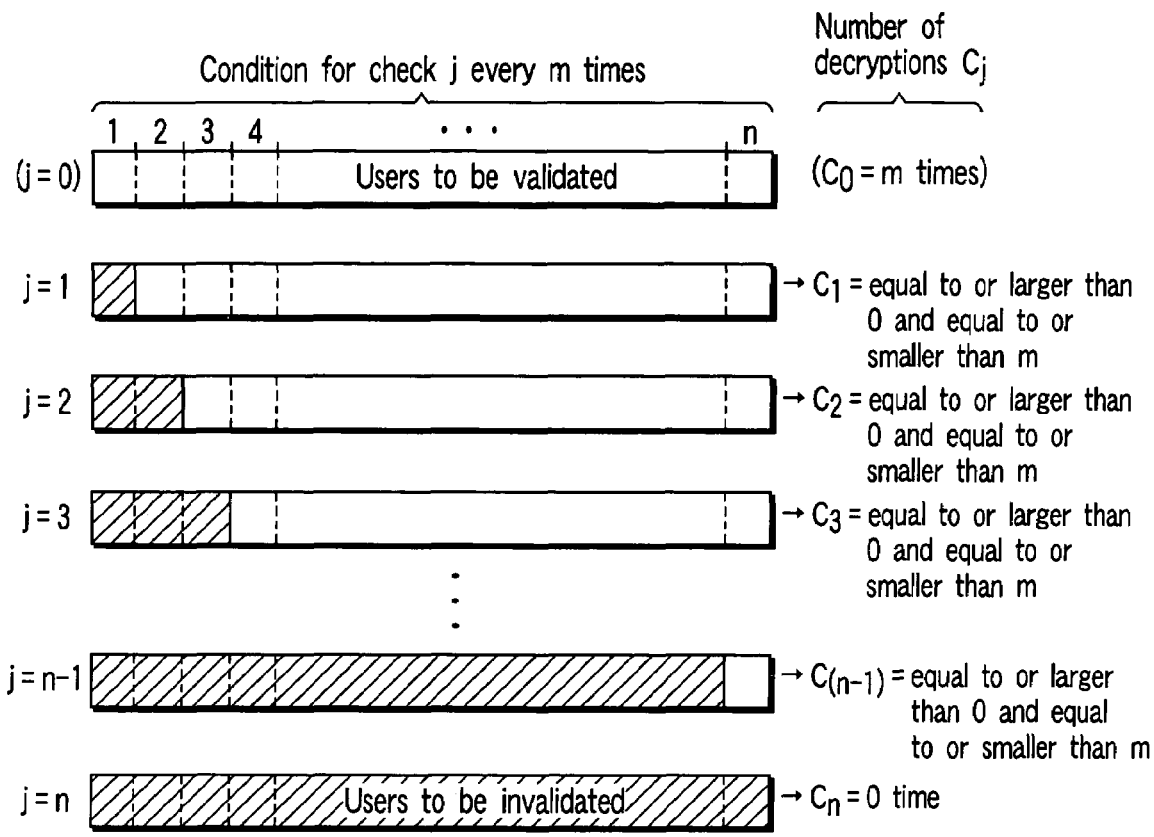
FIG. 10 is a schematic diagram to give an outline of a check in the first embodiment.
Figure 11:
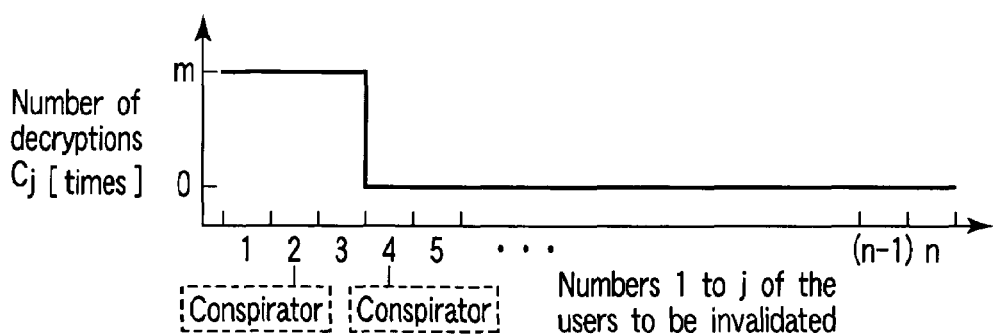
FIG. 11 is a schematic diagram to help explain the result of the check in the first embodiment.

In this tracing method, candidates for pirates belonging to the set of users to be revoked are incremented by one each time and a check is made to see if the candidate cannot be decrypted when the candidate for a pirate is revoked as shown in FIGS. 10 and 11. By making the check the total number of mn times, at least one of the pirates in a coalition can be identified.

For example, suppose the set of user IDs be $\{u_1, \ldots, u_n\}$ and the user IDs of the colluders of the to-be-checked object decrypting unit 20χ be user ID=$u_2$, $u_4$.

In this case, when the header information generated using user ID=$u_1$, $u_2$, $u_3$ as objects to be revoked is given, since the to-be-checked object decrypting unit 20χ corresponds to user ID=$u_4$, the correct session key is obtained. Therefore, after the process is repeated m times, it follows that $C_3$=m.

When the header information generated using user ID=$u_1$, $u_2$, $u_3$, $u_4$ as objects to be revoked is given, since the correct session key cannot be obtained from the to-be-checked object decrypting unit 20χ, after the process is repeated m times, it follows that $C_4$=0.

Therefore, since $C_3-C_4$ has the maximum value m, it is detected that the user ID of one of the colluders in the to-be-checked object decrypting unit 20χ is $u_4$. In addition, by changing the order in which the users are labeled, the user IDs of all of the colluders can be identified.

Generally, there is at least one integer j that satisfies the expression $C_{j-1}-C_j \geq m/n$. When a user with user ID=$u_i$ is not a pirate, the expression $C_{i-1}-C_i \ll m/n$ holds. Thus, the pirate ID can be identified by detecting an integer j with which $C_{j-1}-C_j$ has the maximum value.

Since the header can be calculated using the public key e, anyone can trace a pirate by use of the tracing unit 30. When the to-be-checked object decrypting unit is a more ingenious pirate decoder, it is conceivable that the to-be-checked object decrypting unit detects black box trace and does not accept the input from the header generating section 32 at all. In this case, using the value of j at that time, the unauthorized user ID can be determined to be $u_j$. This holds true for the embodiments explained below.

As described above, with the first embodiment, since the header information includes one or more of the values based on user identification information about at least one of the user systems that are permitted to obtain the session key s and does not explicitly include the user identification information of the user system, information about whose decryption keys have been revoked is not leaked out in black box tracing. Since the intention of each input is not known by a pirate decoder in black box tracing, from an ingenious pirate decoder which tries to read the intention of the input and prevents the pirate from being identified the pirate can be traced surely.

Since there is no limit to the number of suspects who can be checked at a time, efficient black box tracing can be realized.

SECOND EMBODIMENT

Hereinafter, a second embodiment of the present invention will be explained. The second embodiment is a modification of the first embodiment. In the second embodiment, a method of dividing a set of users into sub-groups is different from that of the first embodiment.

For example, when a set of users is divided into $(V \cdot k + \Delta k)$ sub-groups ($1 \leq V$, $0 < \Delta k \leq k$), a method of assigning a key generation polynomial expressed by the following equation (13) to the $(v \cdot k + i)$-th sub-group ($0 \leq v \leq V$, $1 \leq i \leq k$ when $0 \leq v < V$, $1 \leq i \leq \Delta k$ when $v = V$) is possible:

$$f_{v \cdot k + i}(x) = a_0 + a_1 \cdot x + a_2 \cdot x^2 + \cdots + a_{i-1} \cdot x^{i-1} + b_{v,i} \cdot x^i + \qquad (13)$$
$$a_{i+1} \cdot x^{i+1} + \cdots + a_{k-2} \cdot x^{k-2} + a_{k-1} \cdot x^{k-1} + a_k \cdot x^k$$

where $a_0$ to $a_{i-1}$, $a_{i+1}$ to $a_k$ are polynomial coefficients and $b_{v,i}$ is a polynomial coefficient unique to the $(v \cdot k + i)$-th sub-group.

In an example of assigning equation (13) to the $(v \cdot k + i)$-th sub-group, the unique polynomial coefficient $b_{v,i}$ is not set to $a_0$. Instead of this example, the unique polynomial coefficient $b_{v,i}$ can be set to $a_0$ by assigning equation (13c) to the $(v \cdot (k+1) + i + 1)$-th sub-group.

$$f_{v \cdot (k+1) + i + 1}(x) = a_0 + a_1 \cdot x + a_2 \cdot x^2 + \cdots + a_{i-1} \cdot x^{i-1} + \qquad (13c)$$
$$b_{v,i} \cdot x^i + a_{i+1} \cdot x^{i+1} + \cdots + a_{k-2} \cdot x^{k-2} +$$
$$a_{k-1} \cdot x^{k-1} + a_k \cdot x^k$$

where $a_0$ to $a_{i-1}$, $a_{i+1}$ to $a_k$ are polynomial coefficients and $b_{v,i}$ is a polynomial coefficient unique to the $(v \cdot (k+1) + i + 1)$-th sub-group. The above assignment is an example. For instance, a key generation polynomial $f_{v \cdot k + i}(x)$ may be assigned at random and uniquely instead of being caused to correspond to a sub-group number i. There may be a key generation polynomial $f_{v \cdot k + j}(x)$ which is not assigned to any sup-group. This is true for a key generation polynomial $f_{v \cdot (k+i) + i + 1}(x)$ and further for the embodiments explained below.

The individual coefficients, $b_{v,i}$ for v=0, of the key generation polynomial $f_{v \cdot k + i}(x)$, that is, $b_{0,1}, \ldots, b_{0,k}$, correspond to $b_1, \ldots, b_k$ in the above explanation. In the explanation below, $b_{0,1}, \ldots, b_{0,k}$ might be abbreviated as $b_1, \ldots, b_k$ and $b_{1,1}, \ldots, b_{1,k}$ might be abbreviated as $d_1, \ldots, d_k$.

For example, if V=1, $d_1, \ldots, d_{\Delta k}$ ($b_{1,1}, \ldots, b_{1,\Delta k}$ in equation (13)) may be added without increasing the value of k in the key generation phase and the number of key generation polynomials (the number of sub-groups) may be increased as expressed by the following equations (14):

$$f_1(x) = a_0 + b_1 \cdot x + a_2 \cdot x^2 + a_3 \cdot x^3 + \ldots + a_k \cdot x^k$$

$$f_2(x) = a_0 + a_1 \cdot x + b_2 \cdot x^2 + a_3 \cdot x^3 + \ldots + a_k \cdot x^k$$

$$\vdots$$

$$f_k(x) = a_0 + a_1 \cdot x + a_2 \cdot x^2 + a_3 \cdot x^3 + \ldots + b_k \cdot x^k$$

$$f_{k+1}(x) = a_0 + d_1 \cdot x + a_2 \cdot x^2 + a_3 \cdot x^3 + \ldots + a_k \cdot x^k$$

$$f_{k+2}(x) = a_0 + a_1 \cdot x + d_2 \cdot x^2 + a_3 \cdot x^3 + \ldots + a_k \cdot x^k$$

$$\vdots$$

$$f_{k+\Delta k}(x) = a_0 + a_1 \cdot x + d_2 \cdot x^2 + \ldots + d_{\Delta k} \cdot x^{\Delta k} + \ldots + a_k \cdot x^k \qquad (14)$$

When V=1 and Δk=k, this gives the following equations (15):

$$f_1(x) = a_0 + b_1 \cdot x + a_2 \cdot x^2 + a_3 \cdot x^3 + \ldots + a_k \cdot x^k$$

$$f_2(x) = a_0 + a_1 \cdot x + b_2 \cdot x^2 + a_3 \cdot x^3 + \ldots + a_k \cdot x^k$$

$$\vdots$$

$$f_k(x) = a_0 + a_1 \cdot x + a_2 \cdot x^2 + a_3 \cdot x^3 + \ldots + b_k \cdot x^k$$

$$f_{k+1}(x) = a_0 + d_1 \cdot x + a_2 \cdot x^2 + a_3 \cdot x^3 + \ldots + a_k \cdot x^k$$

$$f_{k+2}(x) = a_0 + a_1 \cdot x + d_2 \cdot x^2 + a_3 \cdot x^3 + \ldots + a_k \cdot x^k$$

$$\vdots$$

$$f_{2k}(x) = a_0 + a_1 \cdot x + d_2 \cdot x^2 + a_3 \cdot x^3 + \ldots + d_k \cdot x^k \quad (15)$$

When V>2, parameters are added in a similar manner, thereby increasing the number of key generation polynomials (the number of sub-groups). For example, in equation (13), parameters $b_{v,i}$ is set as follows:

$$b_{v,i} = \begin{bmatrix} b_{0,1} & b_{0,2} & \cdots & \cdots & \cdots & b_{0,k-1} & b_{0,k} \\ b_{1,1} & b_{1,2} & \cdots & \cdots & \cdots & b_{1,k-1} & b_{1,k} \\ \vdots & \vdots & \vdots & b_{v,i} & \vdots & \vdots & \vdots \\ b_{V-1,1} & b_{V-1,2} & \cdots & \cdots & \cdots & b_{V-1,k-1} & b_{V-1,k} \\ b_{V,1} & b_{V,2} & \cdots & b_{V,\Delta k} & \cdots & b_{V,k-1} & b_{V,k} \end{bmatrix}$$

In this case, the corresponding user set $U_{v \cdot k+i}$ is expressed as follows:

$$U_{v \cdot k+i} = \{U_1, U_2, \ldots, \ldots, \ldots, U_{k-1}, U_k, U_{k+1},$$
$$U_{k+2}, \ldots, \ldots, \ldots, U_{2k-1}, U_{2k}, \ldots, \ldots, \ldots,$$
$$U_{v \cdot k+i}, \ldots, \ldots, \ldots, U_{(V-1)k+1},$$
$$U_{(V-1)k+2}, \ldots, \ldots, \ldots, U_{(V-1)k+k-1}, U_{(V-1)k+k},$$
$$U_{V \cdot k+1}, U_{V \cdot k+2}, \ldots, U_{V \cdot k+\Delta k}, \ldots, U_{V \cdot k+k-1},$$
$$U_{V \cdot k+k}\}$$

In addition, the number of key generation polynomials (the number of sub-groups) may be increased by increasing the value of k and adding parameters. An example of increasing the value of k to 2k−1 will be explained in detail in the embodiments below.

As described above, the second embodiment can not only produce the effect of the first embodiment but also change the sub-group dividing method.

THIRD EMBODIMENT

Next, a third embodiment of the present invention will be explained. The third embodiment is a modification of the first embodiment. In the third embodiment, the position in which the session key s is embedded differs from that in the first embodiment and the degree of the key generation polynomials is increased to 2k−1 to enhance security. Hereinafter, a key generation phase, an encryption phase, a decryption phase, and a tracing phase will be explained in that order. The same definitions of parameters and the like as those in the first embodiment will be used, unless otherwise noted.

Let q be a prime number. It is assumed that q is a factor of p−1 and is equal to or larger than n+2k.

(Key Generation Phase)

The content providing system 1 divides a user set U into t disjoint subsets (sub-groups). Let the t disjoint subsets be $U_0, \ldots, U_{t-1}, U_0, \ldots, U_{t-1}$ are open to the public. Parameters $a_0, \ldots, a_{2k-1}, b_0, \ldots, b_{t-1}$ on which a public key is based are selected from Zq at random.

Next, the content providing system 1 calculates a public key e. The public key e is given by equation (1a):

$$e = (g, y_{0,0}, \cdots, y_{0,2k-1}, y_{1,0}, \cdots, y_{1,t-1}) \quad (1a)$$
$$= (g, g^{a_0}, \cdots, g^{a_{2k-1}}, g^{b_0}, \cdots, g^{b_{t-1}})$$

Finally, the content providing system 1 calculates a decryption key $f_i(u)$ of the user ID=u belonging to a subset $U_i$ by substituting x=u into a key generation polynomial $f_i(x)$. Here, the key generation polynomial $f_i(x)$ is assigned to the subset $U_i$ to which user u belongs and is expressed as equation (2a):

$$f_i(x) = \sum_{j=0}^{2k-1} a_{i,j} x^j \bmod q, \quad (2a)$$

$$a_{i,j} = \begin{cases} a_j & (j \neq i \bmod 2k), \\ b_i & (j = i \bmod 2k). \end{cases}$$

(Encryption Phase)

The session key generating section 13 of the content providing system 1 selects a session key s from Gq at random. Then, the header generating section 15 selects random number r and calculates $H_0, \ldots, H_{t-1}$ by repeating the following processes for $0 \leq i \leq t-1$ as shown in FIG. 6 (ST2-1 to ST2-8). In FIG. 6 where the processes are repeated for $1 \leq i \leq t$, read $1 \leq i \leq t$ as $0 \leq i \leq t-1$ in the third embodiment.

The header generating section 15 determines whether an intersection of the set χ of users to be revoked and $U_i$ is an empty set (ST2-2).

Here, a case where an intersection of χ and $U_i$ is an empty set will be explained. This is a case where none of the users belonging to $U_i$ are users to be revoked. For example, $U_3$ of FIG. 2 correspond to this case. The header generating section 15 calculates $H_i$ using the following equation (4a) (ST2-3):

$$\text{When } \chi \cap U_i = \phi, \quad (4a)$$

$$H_i = (\hat{h}_i, h_{i,0}, \cdots, h_{i,2k-1}),$$

$$\hat{h}_i = g^r,$$

$$h_{i,j} = \begin{cases} y_{0,j}^r & (j \neq i \bmod 2k), \\ s \, y_{1,i}^r & (j = i \bmod 2k). \end{cases}$$

If the result of step ST2-2 has shown that an intersection of the set χ of users to be revoked and $U_i$ is not an empty set, the header generating section 15 determines whether an intersection of χ and $U_i$ is $U_i$ (ST2-4).

Here, a case where an intersection of χ and $U_i$ is $U_i$ will be explained. This is a case where all of the users belonging to $U_i$ are users to be revoked. For example, $U_1$ of FIG. 2 corresponds to this case. The header generating section 15 selects random number $z_i$ and calculates $H_i$ using equation (5a) (ST2-5):

$$\text{When } \chi \cap U_i = U_i, \quad (5a)$$

$$H_i = (\hat{h}_i, h_{i,0}, \cdots, h_{i,2k-1}),$$

$$\hat{h}_i = g^r,$$

-continued $$h_{i,j} = \begin{cases} y_{0,j}^{r_i} & (j \neq i \bmod 2k), \\ g^{z_i} & (j = i \bmod 2k) \end{cases}$$

The equation (5a) is used for calculating $H_i$ in a case where, when the decryption keys of all of the users belonging to $U_i$ are revoked, the value $b_i$ unique to the sub-group $U_i$ in the header information $H_i$ is replaced with an incorrect value $z_i$ as described earlier. The present invention is not limited to this. For instance, at the time of revocation, in the header information $H_i$, it may be prevented that the header information $H_i$ includes the element $h_{i,i \bmod 2k}$ as described earlier.

A case where step ST2-4 produces the other result will be explained (ST2-4: NO). This corresponds to, for example, $U_2$ of FIG. 2.

The header generating section 15 sets a subset obtained by removing the set $\chi$ of users to be revoked from $U_i$ as $\{x_1, \ldots, x_w\}$. Then, the header generating section 15 finds an integer d that satisfies the expression $w \leq 2k(d+1)-1$ and gives $m=2k(d+1)-1$.

Thereafter, if $w<m$, the header generating section 15 selects $x_{w+1}, \ldots, x_m$ from $zq-(U+\{0\})$ at random as described earlier. In the above process, an (m'-w) number of different elements $x_{w+1}, \ldots, x_{m'}$ may be added to a subset $\{x_1, \ldots, x_w\}$ as described earlier.

The header generating section 15 determines elements $c_0, \ldots, c_m$ of $Zq$ that satisfy equation (6) for $1 \leq \alpha \leq m$. Finally, the header generating section 15 selects random number $r_i$ and calculates $H_i$ using equation (7a) (ST2-6):

$$H_i = (\hat{h}_i, h_{i,0}, \cdots, h_{i,m}), \quad (7a)$$

$$\hat{h}_i = g^{r_i}$$

$$h_{i,j} = \begin{cases} g^{c_j} y_{0,j \bmod 2k}^{r_i} & (j \neq i \pmod{2k}), \\ g^{c_j} y_{1,i}^{r_i} & (j \neq i \bmod 2k, j \equiv i \pmod{2k}), \\ s g^{c_j} y_{1,i}^{r_i} & (j = i \bmod 2k). \end{cases}$$

Let $H_0, \ldots, H_{t-1}$ obtained in the repeated processes be header $H(\chi)$ (ST2-9). The content providing system 1 transmits the content encrypted using the session key s and the header $H(\chi)$ to the user system 2 (ST3 to ST4).

(Decryption Phase)

Consider user u belongs to the subset $U_i$. When receiving the header $H(\chi)$ (ST5-1) as shown in FIG. 8, the user system 2 with user ID=u calculates equation (8a) using $H_i$:

$$s = \left\{ (h_{i,0} \times h_{i,1}^u \times \cdots \times h_{i,m}^{u^m}) / \hat{h}_i^{f_i(u) \sum_{j=0}^{d} u^{j(k+1)}} \right\}^{1/u^{i \bmod 2k}} \quad (8a)$$

where $d=(m+1)/2k-1$

As in the first embodiment, the results of decryption at the session key decrypting section 22 of the user system 2 are separately explained, depending on whether an intersection of the set $\chi$ of users to be revoked and $U_i$ is an empty set (ST5-2), whether an intersection of the set $\chi$ of users to be revoked and $U_i$ is $U_i$ (ST5-4), or whether an intersection of the set $\chi$ of users to be revoked and $U_i$ is neither an empty set nor $U_i$ (ST6).

(Tracing Phase)

An example of the procedure of the tracing algorithm is the same as that in the first embodiment. Since the header can be calculated using the public key e, anyone can trace a pirate by use of the tracing unit 30.

As described above, with the third embodiment, the configuration where the degree of the key generation polynomial is increased to 2k−1 can not only produce the effect of the first embodiment but also improve the security according to the increase in the degree. In addition, even the configuration where the position in which the session key s is embedded is changed can produce the same effect as that of the first embodiment.

FOURTH EMBODIMENT

Figure 12:
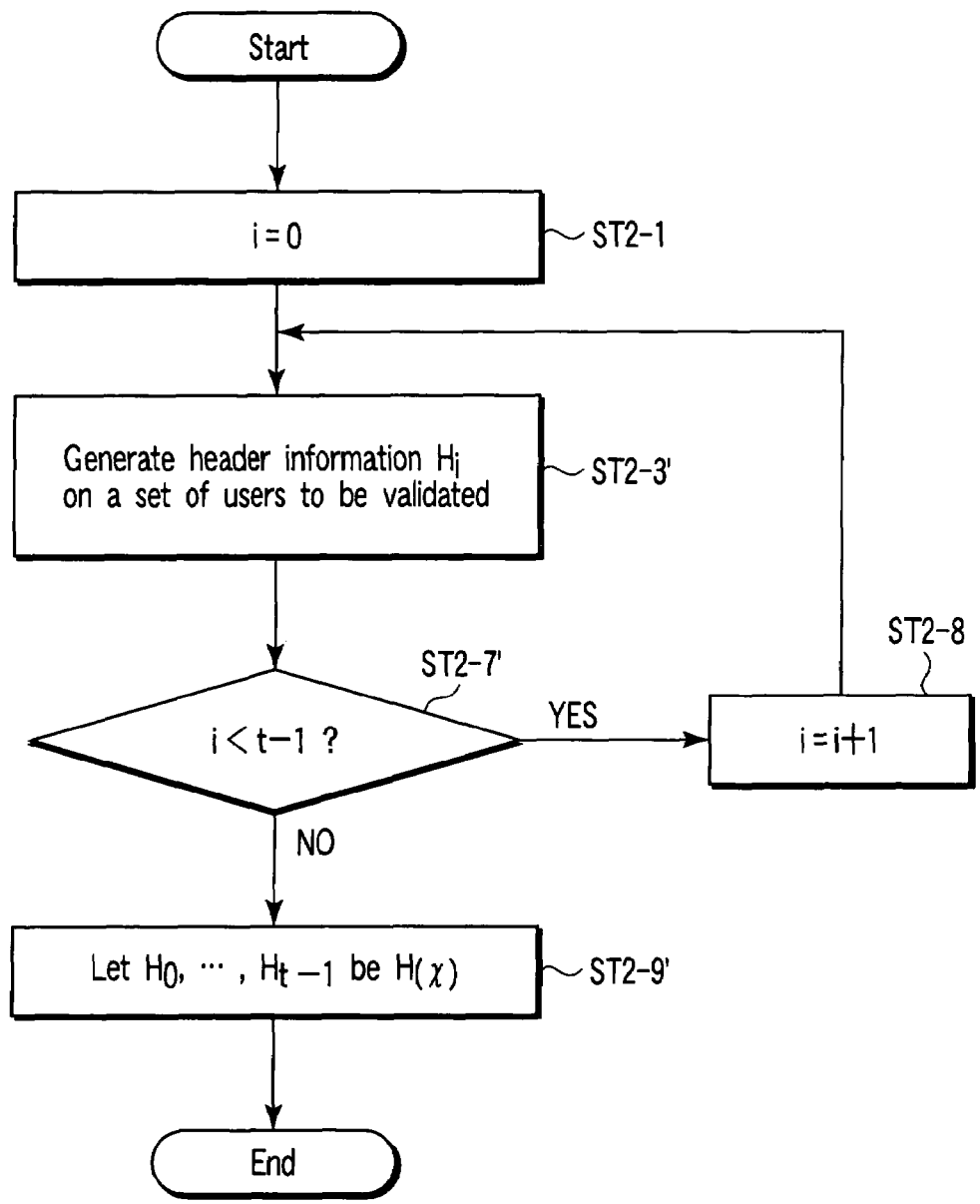
FIG. 12 is a flowchart to help explain the encryption phase operation in a content providing system according to a fourth embodiment of the present invention.

Next, a fourth embodiment of the present invention will be explained by reference to FIG. 12. The fourth embodiment is a modification of the first embodiment. In the fourth embodiment, the decryption keys are not revoked in the encryption phase (that is, all of the receivers are users to be non-revoked). As in the third embodiment, the degree of the key generation polynomial is increased to 2k−1 in the fourth embodiment. Hereinafter, a key generation phase, an encryption phase, a decryption phase, and a tracing phase will be explained in that order. The same definitions of parameters and the like as those in the first embodiment will be used, unless otherwise noted.

Let q be a prime number. It is assumed that q is a factor of p−1 and is equal to or larger than n+2k−1.

(Key Generation Phase)

The procedure for processing in the key generation phase is the same as that in the third embodiment.

(Encryption Phase)

The session key generating section 13 of the content providing system 1 selects a session key s from Gq at random. Then, the header generating section 15 selects random numbers $R_0$, $R_1$ and calculates $H_0, \ldots, H_{t-1}$ by repeating the following processes for $0 \leq i \leq t-1$ as shown in FIG. 12 (ST2-1 to ST2-8).

The value of either $R_0$ or $R_1$ is substituted into $r_i$ and $H_i$ is calculated using equation (4b) (ST2-3'):

$$H_i = (\hat{h}_i, h_{i,0}, \ldots, h_{i,2k-1}), \quad (4b)$$

$$\hat{h}_i = g^{r_i},$$

$$h_{i,j} = \begin{cases} y_{0,j}^{r_i} & (j \neq i \bmod 2k), \\ s y_{1,i}^{r_i} & (j \neq i \bmod 2k) \end{cases}.$$

Let $H_0, \ldots, H_{t-1}$ obtained in the repeated processes be header $H(\chi)$ (ST2-9'). Hereinafter, the content providing system 1 transmits the content encrypted using the session key s and the header $H(\chi)$ to the user system 2 as described earlier (ST3 to ST4).

(Decryption Phase)

Consider user u belongs to the subset $U_i$. When receiving the header $H(\chi)$ as shown in FIG. 8, the user system 2 with user ID=u obtains a session key s by calculating equation (8b) using $H_i$:

$$\left\{\left(h_{i,0} \times h_{i,1}^u \times \ldots \times h_{i,2k-1}^{u^{2k-1}}\right) / \hat{h}_i^{f_i(u)}\right\}^{1/u^i \bmod 2k} = \left\{\left(y_{0,0}^{r_i} \times y_{0,1}^{r_i u} \times \ldots \times y_{1,i}^{r_i u^i \bmod 2k} \times \ldots \times y_{0,2k-1}^{r_i u^{2k-1}}\right) / g^{r_i f_i(u)}\right\}^{1/u^i \bmod 2k} \quad (8b)$$

$$= \left\{s^{u^i \bmod 2k} g^{r_i \sum_{j=0}^{2k-1} a_{i,j} u^j} / g^{r_i f_i(u)}\right\}^{1/u^i \bmod 2k}$$

$$= s.$$

(Tracing Phase)

An example of the procedure of the tracing algorithm is the same as that in the first embodiment. The operation of the tracing phase by the tracing unit is the same as described in FIG. 9. The fourth embodiment differs from the first embodiment in that the procedure for generating a header in the tracing phase differs from that in the encryption phase.

Specifically, as described above, in the fourth embodiment, a header is so generated that all of the users become users to be non-revoked in the encryption phase. In contrast, in the tracing phase, a header is so generated that some of the users are revoked and the others are non-revoked. Since a set of the users to be non-revoked in the tracing phase differs from that in the encryption phase in the fourth embodiment, the procedure for generating a header in the tracing phase differs from that in the encryption phase.

Hereinafter, only the procedure for generating a header in the tracing phase will be explained. For simplicity, it is assumed that the number of the elements of a subset is 2k for any subset, that is, $|U_0|=\ldots=|U_{t-1}|=2k$, n=2kt. Suppose the elements of subsets $U_0, \ldots, U_{t-1}$ are labeled using equation (12b):

$U_0=\{u_1, \ldots, u_{2k}\}$ $U_1=\{u_{2k+1}, \ldots, u_{4k}\}$

⋮

$U_{t-1}=\{u_{n-2k+1}, \ldots, u_n\}$ (12b)

When the set $\chi$ of users to be revoked=$\{u_1, \ldots, u_j\}$, the header $H(\chi)$ is generated according to the following procedure.

$H_0, \ldots, H_{t-1}$ are calculated by repeating the following processes for $0 \leq i \leq t-1$. The notations are the same as those used in the encryption phase.

The header generating section 32 determines whether an intersection of the set $\chi$ of users to be revoked and $U_i$ is an empty set.

Here, a case where an intersection of $\chi$ and $U_i$ is an empty set will be explained. This is a case where none of the users belonging to $U_i$ are users to be revoked. For example, $U_3$ of FIG. 2 corresponds to this case. The header generating section 32 calculates $H_i$ using the following equation (16):

When $\chi \cap U_i = \phi$, (16)

$H_i = (\hat{h}_i, h_{i,0}, \ldots, h_{i,2k-1})$, $\hat{h}_i = g^{R_0}$ $h_{i,j} = \begin{cases} y_{0,j}^{R_0} & (j \neq i \bmod 2k), \\ s y_{1,i}^{R_0} & (j = i \bmod 2k) \end{cases}$.

If an intersection of the set $\chi$ of users to be revoked and $U_i$ is not an empty set, the header generating section 32 determines whether an intersection of $\chi$ and $U_i$ is $U_i$.

Here, a case where an intersection of $\chi$ and $U_i$ is not $U_i$ will be explained. This is a case where at least one of the users belonging to $U_i$ is not a user to be revoked and at least one of them is a user to be revoked. This corresponds to, for example, $U_2$ of FIG. 2.

The header generating section 32 sets a subset obtained by removing the set $\chi$ of users to be revoked from $U_i$ as $\{x_1, \ldots, x_w\}$ as shown in FIG. 7. For example, in the case of $U_2$ of FIG. 2, it follows that $\{x_1, \ldots, x_{10}\}=\{31, \ldots, 40\}$ (w=10).

Next, if w<2k−1, the header generating section 32 selects $x_{w+1}, \ldots, x_{2k-1}$ from $zq-(U+\{0\})$ at random. Here, $zq-(U+\{0\})$ means what is obtained by removing a union of U and $\{0\}$ from Zq.

The header generating section 32 determines elements $c_0, \ldots, c_{2k-1}$ of Zq that satisfy equation (17) for $1 \leq \alpha \leq 2k-1$:

$$\sum_{j=0}^{2k-1} c_j x_\alpha^j = 0 \bmod q \quad (17)$$

Finally, the header generating section 32 calculates $H_i$ using equation (18):

$H_i = (\hat{h}_i, h_{i,0}, \ldots, h_{i,2k-1})$, (18)

$\hat{h}_i = g^{R_1}$ $h_{i,j} = \begin{cases} g^{c_j} y_{0,j}^{R_1} & (j \neq i \bmod 2k), \\ sg^{c_j} y_{1,i}^{R_1} & (j = i \bmod 2k) \end{cases}$.

Here, a case where an intersection of $\chi$ and $U_i$ is $U_i$ will be explained. This is a case where all of the users belonging to $U_i$ are users to be revoked. For example, $U_1$ of FIG. 2 corresponds to this case. The header generating section 32 selects random number $z_i$ and calculates $H_i$ using equation (19):

When $\chi \cap U_i = U_i$, (19)

$H_i = (\hat{h}_i, h_{i,0}, \ldots, h_{i,2k-1})$, $\hat{h}_i = g^{r_i}$ $h_{i,j} = \begin{cases} h'_{i,j} & (j \neq i \bmod 2k), \\ g^{z_i} & (j = i \bmod 2k) \end{cases}$.

$h'_{i,j}$ are further defined in the following two cases and are calculated using equation (20) or equation (21).

If there is no $U_L$ ($0 \leq L \leq t-1$) satisfying $\chi \cap U_L \neq \phi$ and $\chi \cap U_L \neq U_L$, this gives $h'_{i,j} = y_{O,j}^{r_i}$ (20)

If there is $U_L$ ($0 \leq L \leq t-1$) satisfying $\chi \cap U_L \neq \phi$ and $\chi \cap U_L \neq U_L$, this gives $$h'_{i,j} = \begin{cases} y_{0,j}^{R_0} & (r_i = R_0), \\ g^{c_j} y_{0,j}^{R_1} & (r_i = R_1). \end{cases} \quad (21)$$

Let $H_0, \ldots, H_{t-1}$ obtained in the repeated processes be header $H(\chi)$.

Since the header can be calculated using the public key e, anyone can trace a pirate by use of the tracing unit 30.

As described above, with the fourth embodiment, the configuration where the degree of the key generation polynomial is increased to $2k-1$ can not only produce the effect of the first embodiment but also improve security according to the increase in the degree. In addition, even the configuration where the decryption keys are not revoked in the encryption phase produces a similar effect to that of the first embodiment.

FIFTH EMBODIMENT

Next, a fifth embodiment of the present invention will be explained. The fifth embodiment, which is a modification of the third or fourth embodiment, uses a binary tree structure where divided sub-groups are assigned to leaves. Specifically, key generation polynomials are assigned to the individual nodes in the paths extending from the root of the binary tree structure to a plurality of leaves by way of the nodes. This is an example of hierarchizing key generation polynomials in multilevel form. While in the example below, a binary tree structure will be explained, the present invention is not restricted to this. For instance, the number of branches may take any value. In one tree structure, nodes differing in the number of branches may exist. The number of nodes (the number of levels) in the path from the root to a leaf is not necessarily the same for all of the leaves. There may be a leaf positioning at a different level. As in the third and fourth embodiments, the degree of a key generation polynomial has been increased to $2k-1$. Hereinafter, a key generation phase, an encryption phase, a decryption phase, a trace phase will be explained in that order. The definitions of parameters and others are the same as in the first embodiment, unless otherwise specified.

Let q be a prime number. It is assumed that q is a factor of p-1 and is equal to or larger than $n+2k-1$.

(Key Generation Phase)

The content provider system 1 divides a user set U into a t number of subsets (sub-groups) having no common element. To simplify the explanation, suppose t=4, let these four subsets be $U_0, \ldots, U_3$, and $|U_0|=|U_1|=|U_2|=|U_3|=2k$. $U_0, \ldots, U_3$ are open to the public. Parameters $a_0, \ldots, a_{2k-1}, b_0, \ldots, b_{2k-1}, c_0, \ldots, c_6, d_0, \ldots, d_6, \lambda$ on which a public key is based are selected from Zq at random. The number of parameters $c_0, \ldots, c_6$ and the number of parameters $d_0, \ldots, d_6$ are each 7(=2t-1).

Figure 14:
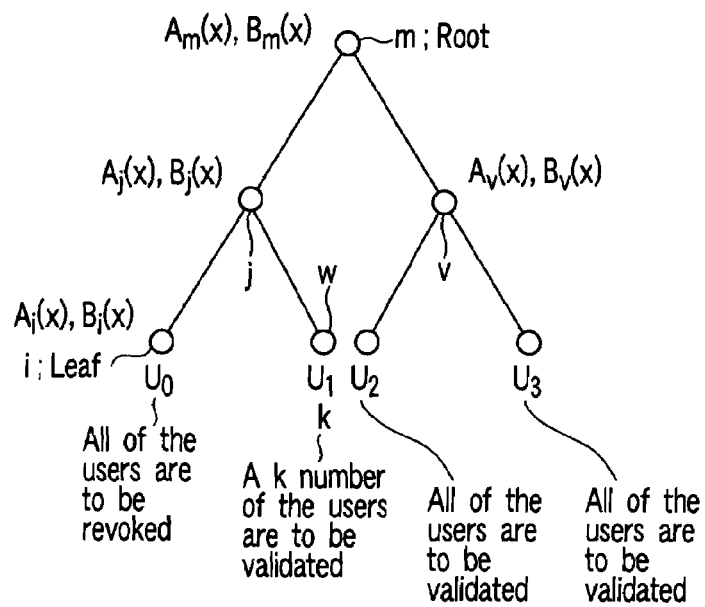
FIG. 14 is a diagram to help explain the assignment of key generation polynomials according to a fifth embodiment of the present invention.

Next, the content provider system 1 assigns key generation polynomials $A_i(x), B_i(x)$ to the individual nodes as shown in FIG. 14. Here, the nodes are labeled 0 to $2t-2$, respectively. The key generation polynomials $A_i(x), B_i(x)$ are generated using equation (22).

$$\begin{cases} A_m(x) = a_0 + a_1 x + \lambda b_2 x^2 + \lambda d_m x^3 + \lambda b_4 x^4 + \ldots + a_{2k-1} x^{2k-1} \\ B_m(x) = b_0 + b_1 x + \lambda^{-1} a_2 x^2 + \lambda^{-1} c_m x^3 + \lambda^{-1} a_4 x^4 + \ldots + b_{2k-1} x^{2k-1} \end{cases} \quad (22)$$

$$\begin{cases} A_j(x) = a_0 + \lambda b_1 x + c_j x^2 + a_3 x^3 + \ldots + a_{2k-1} x^{2k-1} \\ B_j(x) = b_0 + \lambda^{-1} a_1 x + d_j x^2 + b_3 x^3 + \ldots + b_{2k-1} x^{2k-1} \end{cases}$$

$$\begin{cases} A_i(x) = a_0 + c_i x + a_2 x^2 + a_3 x^3 + \ldots + a_{2k-1} x^{2k-1} \\ B_i(x) = b_0 + d_i x + b_2 x^2 + b_3 x^3 + \ldots + b_{2k-1} x^{2k-1} \end{cases}$$

$c_i$, $d_i$, which are coefficients unique to the key generation polynomials assigned to the nodes, are embedded in coefficients of (i mod 2k) order. Equation (22) is an example for i mod 2k=1, j mod 2k=2, m mod 2k=3. The constant $\lambda$ is a secret constants whose embedded positions and the number of which can be set arbitrarily. In the key generation polynomials $A_i(x), B_i(x)$ in the same node, the embedded positions of $\lambda$ and the number of $\lambda$ to be embedded are the same.

Next, the content providing system 1 calculates public key e. The public key e is expressed as equation (23):

Public key $e$ (when $t=4$)

$$(g, g^\lambda, g^{a_0+\lambda b_0}, \ldots, g^{a_{2k-1}+\lambda b_{2k-1}}, g^{c_0+\lambda d_0}, \ldots, g^{c_6+\lambda d_6}) \quad (23)$$

Finally, the content providing system 1 generates a decryption key for user ID=u belonging to the subset $U_i$. For example, when user u belongs to $U_0$, the content provider system 1 calculates the decryption key by substituting x=u into the key generation polynomials $A_i(x), B_i(x), A_j(x), B_j(x), A_m(x), B_m(x)$. Here, the key generation polynomials $A_i(x), B_i(x), A_j(x), B_j(x), A_m(x), B_m(x)$ are assigned to the subset $U_0$ to which user u belongs and are expressed as equation (22):

(Encryption Phase)

Figure 15:
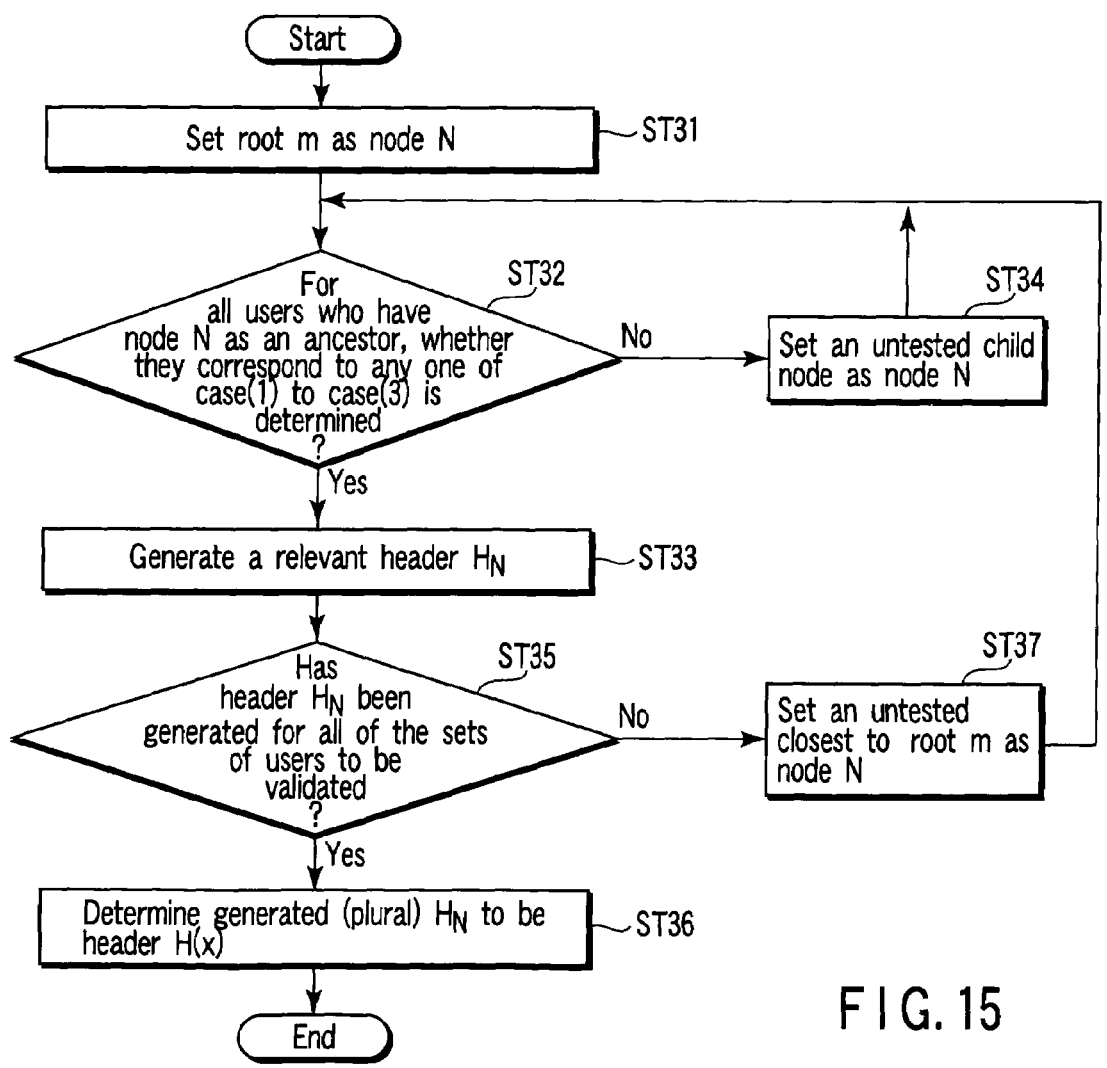
FIG. 15 is a flowchart to help explain the operation in the decryption phase in the fifth embodiment.

The session key generating section 13 of the content providing system 1 selects a session key s from Gq at random. Then, the header generating section 15 selects random numbers R0, R1. Hereinafter, explanation will be given using FIG. 15. First, root m is set as node N (ST31). For all users who have node N as an ancestor, it is determined whether they correspond to any one of the following cases (1) to (3) (ST32): (1) when all of the users are to be revoked, (2) when all of the users are to be validated, and (3) when the number of users to be validated is equal to or larger than 1 and equal to or less than $2k-1$.

The word ancestor means not only a root but also a parent node, a parent node of a parent, or a parent node of a parent of a parent, . . .

The header generating section 15 calculates header $H_N$ on the basis of the result of the determination (ST33).

(1) When All of the Users Are to be Revoked

The header generating section 15 calculates $H_N$ using equation (24). The value of any one of the random numbers $R_0, R_1$ is substituted into r (at random each time $H_N$ is calculated).

$$H_N = (h_N, h'_N, h_{N,0}, h_{N,1}, \ldots, h_{N,y_N}, \ldots, h_{N,2k-1})$$
$$= (g^r, g^{\lambda r}, g^{(a_0+\lambda b_0)r}, g^{(a_1+\lambda b_1)r}, \ldots, g^{z_N}, \ldots, g^{(a_{2k-1}+\lambda b_{2k-1})r})$$

$y_N$=N mod 2k

As described above, equation (24) is an example of, in revoking, setting values $c_N$, $d_N$ unique to the set of users having node N as an ancestor to value $z_N$ differing from the correct value. Moreover, in revoking, the unique values $c_N$, $d_N$ may be eliminated as described above.

(2) When All of the Users Are to be Validated

The header generating section 15 calculates $H_N$ using equation (25). Random number $R_0$ is substituted into r. If item (3) below does not exist, either random number $R_0$ or random number $R_1$ is substituted into r (at random each time HN is calculated).

$$H_N = (h_N, h'_N, h_{N,0}, h_{N,1}, \ldots, h_{N,y_N}, \ldots, h_{N,2k-1}) \quad (25)$$
$$= (g^r, g^{\lambda r}, g^{(a_0+\lambda b_0)r}, g^{(a_1+\lambda b_1)r}, \ldots,$$
$$sg^{(c_N+\lambda d_N)r}, \ldots, g^{(a_{2k-1}+\lambda b_{2k-1})r})$$

$y_N = N \bmod 2k$ (3) When the Number of Users to be Validated is Equal to or Larger Than 1 and Equal to or Smaller Than $2k-1$ The header generating section 15 determines the elements $L_0, \ldots, L_{2k-1}$ of Zq in the same manner as finding the elements $c_0, \ldots, c_{2k-1}$ of Zq fulfilling equation (17) explained in the trace phase of the fourth embodiment and calculates $H_N$ using equation (26). Random number $R_1$ is substituted into r.

$$H_N = (h_N, h'_N, h_{N,0}, h_{N,1}, \ldots, h_{N,y_N}, \ldots, h_{N,2k-1}) \quad (26)$$
$$= (g^r, g^{\lambda r}, g^{L_0}g^{(a_0+\lambda b_0)r}, g^{L_1}g^{(a_1+\lambda b_1)r}, \ldots,$$
$$= sg^{L_{y_N}}g^{(c_N+\lambda d_N)r}, \ldots, g^{L_{2k-1}}g^{(a_{2k-1}+\lambda b_{2k-1})r})$$

$y_N = N \bmod 2k$

When a user does not belong to any one of item (1) to item (3) (ST32: No), an untested child node of node N is set as node N (ST34) and the above processes are repeated. A leaf may be set as node N.

It is determined whether $H_N$ has been generated for all of the sets of users to be validated (ST35). If $H_N$ has been generated for all of the sets of users to be validated, the generated (plural) $H_N$ are set as header H(x) (ST36). If not (ST35: No), an untested node closest to root m, that is, the untested node at the highest level, is set as node N (ST37) and the above processes are repeated. A leaf may be set as node N.

While in the above example, the method of selecting a node whose level is as high as possible to decrease the header size as much as possible has been explained, the present invention is not limited to this. For instance, the following method is possible. In FIG. 14, if all of the users belonging to $U_0$ are to be revoked and a k number of the users belonging to $U_1$ are to be validated, all of the users belonging to $U_2$ are to be validated, and all of the users belonging to $U_3$ are to be validated, node j and node v are selected according to a flowchart in FIG. 15, which gives $H(x)=(H_j, H_v)$. Here, node j is the parent node for leaf i (corresponding to $U_0$) and leaf w (corresponding to $U_1$) Node v is the parent node for a leaf corresponding to $U_2$ and a leaf corresponding to $U_3$. The invention is not restricted to this. As long as the condition of step ST32 is fulfilled, nodes may be selected in any way. For instance, leaf i, leaf w, and node v may be selected, which gives $H(x)=(H_i, H_w, H_v)$.

(Decryption Phase)

User u belonging subset $U_0$ is considered. When receiving header $H(\chi)$, the user system 2 with user ID=u obtains session key s from equation (27) using the ones of $H_i$, $H_j$, and $H_m$ included in header $H(\chi)$. The following equation, which is included in header $H(\chi)$, is a calculating formula for user u to obtain session key s using $H_j$.

$$\text{Header } H_j \quad (27)$$
$$H_j = (h_j, h'_j, h_{j,0}, h_{j,1}, \ldots, h_{j,y_j}, \ldots, h_{j,2k-1})$$
$$y_j = j \bmod 2k$$

Decryption $$s = \left( \frac{h_{j,0} \times h_{j,1}^u \times \ldots \times h_{j,2k-1}^{u^{2k-1}}}{h_j^{A_j(u)} h_j'^{B_j(u)}} \right)^{1/u^{j \bmod 2k}}$$

(Trace Phase)

An example of trace algorithm procedure is the same as in the first embodiment. The operation in the trace phase of the trace unit is the same as in FIG. 9. Since a header can be calculated using public key e, anyone can trace pirate by use of the trace unit 30.

As described above, according to this embodiment, use of the configuration which organizes key generation polynomials in multilevel form enables the header size to be decreased according to the level of a key generation polynomial in addition to the effects of the third and fourth embodiments. Even the multilevel configuration of key generation polynomials produces the same effect as in the first embodiment.

Any of the encryption unit, decryption unit, and tracing unit of the above-described embodiments can be realized in hardware, such as a semiconductor integrated device, or in software (programs for causing a computer to execute specific means or to function as specific means or realize specific functions). Of course, they can be realized by combining hardware with software.

When the encryption unit, decryption unit, and tracing unit are realized in programs, they may be stored on a storage medium, such as a magnetic disk (e.g., floppy (a registered trademark) disk or hard disk), an optical disk (e.g., CD-ROM or DVD), a magneto-optical disk (MO), or a semiconductor memory, and then be distributed.

The storage medium may use any storing method, as long as the medium can store programs and be read by a computer.

On the basis of the programs installed from the storage medium into the computer, the operating system running on the computer or middleware including database management software and network software may execute part of the processes necessary to realize the above-described embodiments.

The storage medium of the present invention includes not only a storage medium independent of the computer but also a storage medium obtained by downloading and storing or temporarily storing the program transmitted via a LAN or the Internet.

The number of storage mediums is not limited to one. For instance, a case where the processes in the embodiments are carried out with a plurality of storage media may be included in the storage medium of the present invention. The configuration of the storage medium may take any form.

The computer of the present invention executes each process in the embodiments on the basis of the programs stored in the storage medium. The computer may be a single personal computer or a system formed by connecting a plurality of computers via a network.

In addition, the computer of the present invention, which includes not only a personal computer but also an arithmetic processing unit and a microcomputer, is a generic term used to refer to instruments and apparatuses capable of realizing the functions of the present invention by use of programs.

The configurations in the embodiments are illustrative and not restrictive. For instance, a part of the configuration may be replaced with another element or eliminated. Another function or element may be added to the configurations. The configurations may be combined to form another configuration. Another configuration equivalent logically to the illustrated configuration, another configuration including a part equivalent logically to the illustrated configuration, and another configuration equivalent logically to the main part of the illustrated configuration are possible. Another configuration which achieves the same object as or a similar object to that of the illustrated configuration, and another configuration which produces the same effect as or a similar effect to that of the illustrated configuration are possible.

Wide variations of the component parts in the embodiments may be combined suitably.

The embodiments of the present invention include inventions related to various viewpoints, stages, concepts, and categories, including a separate apparatus of the invention, two or more apparatuses related to one another according to the invention, a whole system of the invention, the component parts in a separate apparatus according to the invention, and methods corresponding to these apparatuses.

Accordingly, it is possible to extract an invention from the contents disclosed in the embodiments of the invention without limitation to the illustrated configurations.

The present invention is not limited to the above embodiments and may be modified and embodied variously in the technical scope. That is, the present invention is not limited to the above embodiments and may be practiced or embodied in still other ways without departing from the spirit or essential character thereof. In addition, various inventions are produced by suitably combining the component parts disclosed in the above embodiments. For instance, some of the component parts shown in the embodiments may be eliminated. Furthermore, component elements in more than one embodiment may be combined suitably.

What is claimed is:

1. A content providing system which receives an encryption key corresponding to decryption keys assigned to a plurality of user systems from a third-party unit and provides encrypted content and header information to decrypt the encrypted content to each of said plurality of user systems, the decryption key being a value obtained by substituting user identification information unique to a user system into a key generation polynomial assigned to each sub-group to which a plurality of pieces of user identification information belong, the content providing system comprising:
   a content encrypting device configured to encrypt content using a session key and obtain the encrypted content;
   a header information generating device configured to encrypt the session key using the encryption key and generate header information which includes the obtained encrypted session key and one or more values based on user identification information about at least one of the user systems which are permitted to obtain the session key; and
   a transmission device configured to transmit the encrypted content and at least a portion of the header information to each of the user systems.

2. The content providing system according to claim 1, wherein each key generation polynomial comprises polynomial coefficients at least part of which is different from polynomial coefficients of any other key generation polynomial.

3. The content providing system according to claim 1, wherein, if the degree of the polynomial is k and the user identification information is x, the assigning device assigns the following key generation polynomial $f_{v \cdot k+i}(x)$ to a $(v \cdot k+i)$-th sub-group ($0 \leq v$, $1 \leq i \leq k$):

$$f_{v \cdot k+i}(x) = a_0 + a_1 \cdot x + a_2 \cdot x^2 + \ldots + a_{i-1} \cdot x^{i-1} + b_{v,i} \cdot x^i + a_{i+1} \cdot x^{i+1} + \ldots + a_{k-2} \cdot x^{k-2} + a_{k-1} \cdot x^{k-1} + a_k \cdot x^k$$

where $a_0$ to $a_{i-1}$, $a_{i+1}$ to $a_k$ are polynomial coefficients and $b_{v,i}$ is a polynomial coefficient unique to the $(v \cdot k+i)$-th sub-group.

4. The content providing system according to claim 1, wherein, if the degree of the polynomial is k and the user identification information is x, the assigning device assigns the following key generation polynomial $f_{v \cdot (k+1)+i+1}(x)$ to a $(v \cdot (k+1)+i+1)$-th sub-group ($0 \leq v$, $0 \leq i \leq k$):

$$f_{v \cdot (k+1)+i+1}(x) = a_0 + a_1 \cdot x + a_2 \cdot x^2 + \ldots + a_{i-1} \cdot x^{i-1} + b_{v,i} \cdot x^i + a_{i+1} \cdot x^{i+1} + \ldots + a_{k-2} \cdot k^{k-2} + a_{k-1} \cdot x^{k-1} + a_k \cdot x^k$$

where $a_0$ to $a_{i-1}$, $a_{i+1}$ to $a_k$ are polynomial coefficients and $b_{v,i}$ is a polynomial coefficient unique to the $(v \cdot (k+1)+i+1)$-th sub-group.

5. The content providing system according to claim 1, wherein, if the degree of the polynomial is 2k−1 and the user identification information is x, the assigning device assigns the following key generation polynomial $f_{2vk+i+1}(x)$ to a $(2vk+i+1)$-th sub-group ($0 \leq v$, $0 \leq i \, 2k-i$):

$$f_{2vk+i+1}(x) = a_0 + a_1 \cdot x + a_2 \cdot x^2 + \ldots + a_{i-1} \cdot x^{i-1} + b_{v,i} \cdot x^i + a_{i+1} \cdot x^{i+1} + \ldots + a_{2k-3} \cdot x^{2k-3} + a_{2k-2} \cdot x^{2k-2} + a_{2k-1} \cdot x^{2k-1}$$

where $a_0$ to $a_{i-1}$, $a_{i+1}$ to $a_{2k-1}$ are polynomial coefficients and $b_{v,i}$ is a polynomial coefficient unique to the $(2vk+i+1)$-th sub-group.

6. The content providing system according to claim 1, wherein the header information includes, as part of data enabling to obtain the session key, data which is used only by user systems each of whose user identification information belongs to a sub-group, and
   the header information generating device, when the decryption keys of all of the user systems each of whose user identification information belongs to a specific sub-group are revoked, sets an incorrect value as the data which is used only by the user systems each of whose user identification information belongs to the specific sub-group.

7. The content providing system according to claim 1, wherein the header information includes, as part of data enabling to obtain the session key, data which is used only by user systems each of whose user identification information belongs to a sub-group, and
   the header information generating device, when the decryption keys of all of the user systems each of whose user identification information belongs to a specific sub-group are revoked, prevents that the header information includes the data which is used only by the user systems each of whose user identification information belongs to the specific sub-group.

8. The content providing system according to claim 1, wherein the header information includes, as part of data enabling to obtain the session key, data which is used only by user systems each of whose user identification information belongs to a sub-group and one or more values based on a subset of user identification information of user systems each of whose user identification information belongs to the sub-group, and the header information generating device, when the decryption keys of one or more of the user systems each of whose user identification information belongs to the sub-group are revoked, prevents that the header information includes the one or more values based on the user identification information of the one or more of user systems each of whose user identification information belongs to the sub-group and whose decryption keys are to be revoked.

9. The content providing system according to claim 8, wherein the header information generating device, when the decryption keys of all of the user systems each of whose user identification information belongs to one other sub-group different from the sub-group are revoked, sets an incorrect value as the data which is used only by the user systems each of whose user identification information belongs to the one other sub-group.

10. The content providing system according to claim 8, wherein the header information generating device, when the decryption keys of all of the user systems each of whose user identification information belongs to one other sub-group different from the sub-group are revoked, prevents that the header information includes the data which is used only by the user systems each of whose user identification information belongs to the one other sub-group.

11. The content providing system according to claim 1, wherein the transmission device commoditizes the same ones of the elements in the header information for each of the sub-groups and transmits the commoditized elements.

12. A content providing system which receives an encryption key corresponding to decryption keys assigned to a plurality of user systems from a third-party unit and provides encrypted content and header information to decrypt the encrypted content to each of said plurality of user systems, the content providing system comprising:

a content encrypting device configured to encrypt content using a session key and obtain the encrypted content;

a header information generating device configured to encrypt the session key using the encryption key and generate header information which includes the obtained encrypted session key and one or more values based on user identification information about at least one of the user systems which are permitted to obtain the session key; and a transmission device configured to transmit the encrypted content and at least a portion of the header information to each of the user systems, wherein, in a tree structure which starts from a root, passes through zero or more nodes, and reaches a plurality of leaves, when sub-groups to which a plurality of pieces of user identification information belong are assigned to the leaves in a one-to-one correspondence, different key generation polynomials are assigned to part of or all of the root, the nodes, and the leaves, and at least one of all of the key generation polynomials assigned to the tree structure is assigned in units of one or more sub-groups, the decryption key is a set of at least one value obtained by substituting user identification information unique to a user system into at least one key generation polynomial assigned in units of one or more sub-groups.

13. The content providing system according to claim 12, wherein the key generation polynomials have a plurality of polynomial coefficients, any one of which takes one or more values unique to the root, one of the nodes, or one of the leaves and are such that at least one polynomial coefficient is multiplied by or divided by a secret constant.

14. A content providing method used in a content providing system which provides encrypted content and header information to decrypt the encrypted content to a plurality of user systems, the content providing method comprising:

encrypting content to be provided using a session key and obtaining the encrypted content;

receiving an encryption key corresponding to decryption keys assigned to each of said plurality of user systems from a third-party unit, the decryption key being a value obtained by substituting user identification information unique to a user system into a key generation polynomial assigned to each sub-group to which a plurality of pieces of user identification information belong;

encrypting the session key with the encryption key and generating header information which includes the obtained encrypted session key and one or more values based on user identification information about at least one of the user systems which are permitted to obtain the session key; and transmitting the encrypted content and at least a portion of the header information to each of the user systems.

15. A content providing method used in a content providing system which provides encrypted content and header information to decrypt the encrypted content to a plurality of user systems, the content providing method comprising:

encrypting content to be provided using a session key and obtaining the encrypted content;

receiving an encryption key corresponding to decryption keys assigned to each of said plurality of user systems from a third-party unit;

encrypting the session key with the encryption key and generating header information which includes the obtained encrypted session key and one or more values based on user identification information about at least one of the user systems which are permitted to obtain the session key; and transmitting the encrypted content and at least a portion of the header information to each of the user systems, wherein, in a tree structure which starts from a root, passes through zero or more nodes, and reaches a plurality of leaves, when sub-groups to which a plurality of pieces of user identification information belong are assigned to the leaves in a one-to-one correspondence, different key generation polynomials are assigned to part of or all of the root, the nodes, and the leaves, and at least one of all of the key generation polynomials assigned to the tree structure is assigned in units of one or more sub-groups, the decryption key is a set of at least one value obtained by substituting user identification information unique to a user system into at least one key generation polynomial assigned in units of one or more sub-groups.

16. A content decrypting method used in a user system which decrypts encrypted content provided by a content providing system, the content decrypting method comprising:

receiving, from the content providing system, encrypted content capable of being ecrypted by use of a session key and at least a portion of header information that includes a session key encrypted in such a manner that the session key can be obtained by use of a decryption key assigned to each of one or more user systems and one or more values based on the user identification information about at least one of the one or more user systems which are permitted to obtain the session key, the header information not including a value based on user identification information about another of the one or more user systems that are not permitted to obtain the session key;

decrypting an encrypted session key from the received header information on the basis of the decryption key, using as the decryption key a value obtained by substituting the user identification information of the user system into a key generation polynomial assigned to a sub-group to which the user identification information of the user system belongs; and decrypting the encrypted content on the basis of the decrypted session key.

17. A content decrypting method used in a user system which decrypts encrypted content provided by a content providing system, the content decrypting method comprising:

receiving, from the content providing system, encrypted content capable of being decrypted by use of a session key and at least a portion of header information that includes a session key encrypted in such a manner that the session key can be obtained by use of a decryption key assigned to each of one or more user systems and one or more values based on the user identification information about at least one of the one or more user systems which are permitted to obtain the session key, the header information not including a value based on user identification information about another of the one or more user systems that are not permitted to obtain the session key;

decrypting an encrypted session key from the received header information on the basis of the decryption key, using as the decryption key a set of at least one value obtained by substituting the user identification information of the user system into at least one key generation polynomial assigned in units of one or more sub-groups, when, in a tree structure which starts from a root, passes through zero or more nodes, and reaches a plurality of leaves, sub-groups to which a plurality of pieces of user identification information belong are assigned to the leaves in a one-to-one correspondence, different key generation polynomials are assigned to part of or all of the root, the nodes, and the leaves, and at least one of all of the key generation polynomials assigned to the tree structure is assigned in units of one or more sub-groups; and decrypting the encrypted content on the basis of the decrypted session key.

18. A computer-readable storage medium including computer executable instructions which when executed in a computer for a content providing system control the computer to encrypt content and header information to decrypt the encrypted content to a plurality of user systems, comprising:

first computer executable instructions which cause the computer to execute the process of receiving an encryption key corresponding to decryption keys assigned to each of said plurality of user systems from a third-party unit, the decryption key being a value obtained by substituting user identification information unique to a user system into a key generation polynomial assigned to each sub-group to which a plurality of pieces of user identification information belong;

second computer executable instructions which cause the computer to execute the process of encrypting content using a session key and obtaining the encrypted content;

third computer executable instructions which cause the computer to execute the process of encrypting the session key using the encryption key and generating header information which includes the obtained encrypted session key and one or more values based on user identification information about at least one of the user systems which are permitted to obtain the session key; and fourth computer executable instructions which cause the computer to execute the process of transmitting the encrypted content and at least a portion of the header information to each of the user systems.

19. A computer-readable storage medium including computer executable instructions which when executed in a computer for a content providing system control the computer to encrypt content and header information to decrypt the encrypted content to a plurality of user systems, comprising:

first computer executable instructions which cause the computer to execute the process of receiving an encryption key corresponding to decryption keys assigned to each of said plurality of user systems from a third-party unit;

second computer executable instructions which cause the computer to execute the process of encrypting content using a session key and obtaining the encrypted content;

third computer executable instructions which cause the computer to execute the process of encrypting the session key using the encryption key and generating header information which includes the obtained encrypted session key and one or more values based on user identification information about at least one of the user systems which are permitted to obtain the session key; and fourth computer executable instructions which cause the computer to execute the process of transmitting the encrypted content and at least a portion of the header information to each of the user systems, wherein, in a tree structure which starts from a root, passes through zero or more nodes, and reaches a plurality of leaves, when sub-groups to which a plurality of pieces of user identification information belong are assigned to the leaves in a one-to-one correspondence, different key generation polynomials are assigned to part of or all of the root, the nodes, and the leaves, and at least one of all of the key generation polynomials assigned to the tree structure is assigned in units of one or more sub-groups, the decryption key is a set of at least one value obtained by substituting user identification information unique to a user system into at least one key generation polynomial assigned in units of one or more sub-groups.

20. A computer-readable storage medium including computer executable instructions which when executed in a computer for a user system control the computer to decrypt encrypted content provided by a content providing system, comprising:

first computer executable instructions which cause the computer to execute the process of receiving, from the content providing system, encrypted content capable of being decrypted by use of a session key and at least a portion of header information that includes a session key encrypted in such a manner that the session key can be obtained by use of a decryption key assigned to the user system and one or more values based on the user identification information about at least one of the user systems which are permitted to obtain the session key, the header information not including a value based on user identification information about another of the one or more user systems that are not permitted to obtain the session key;

second computer executable instructions which cause the computer to execute the process of decrypting an encrypted session key from the received header information on the basis of the decryption key and which further includes a program code causing the computer to execute the process of using as the decryption key the value obtained by substituting the user identification information of the user system into the key generation polynomial assigned to the sub-group to which the user identification information of the user system belongs; and third computer executable instructions which cause the computer to execute the process of decrypting the encrypted content on the basis of the decrypted session key.

21. An encryption apparatus used in a content providing system which receives an encryption key corresponding to decryption keys assigned to a plurality of user systems from a third-party unit and provides encrypted content and header information to decrypt the encrypted content to each of said plurality of user systems, the encryption apparatus comprising:

a content encrypting device configured to encrypt content using a session key and obtain the encrypted content; and a header information generating device configured to encrypt the session key using the encryption key and generate header information which includes the obtained encrypted session key and one or more values based on user identification information about at least one of the user systems which are permitted to obtain the session key, wherein, in a tree structure which starts from a root, passes through zero or more nodes, and reaches a plurality of leaves, when sub-groups to which a plurality of pieces of user identification information belong are assigned to the leaves in a one-to-one correspondence, different key generation polynomials are assigned to part of or all of the root, the nodes, and the leaves, and at least one of all of the key generation polynomials assigned to the tree structure is assigned in units of one or more sub-groups, the decryption key is a set of at least one value obtained by substituting user identification information unique to a user system into at least one key generation polynomial assigned in units of one or more sub-groups.

\* \* \* \* \*